US012645323B2

(12) United States Patent
Shen

(10) Patent No.: US 12,645,323 B2
(45) Date of Patent: Jun. 2, 2026

(54) SENSING SYSTEM AND METHOD TO PERFORM TEMPERATURE STABLE PROFILE SENSING

(71) Applicant: Synaptics Incorporated, San Jose, CA (US)

(72) Inventor: Guozhong Shen, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 19/018,229

(22) Filed: Jan. 13, 2025

(65) Prior Publication Data

US 2026/0118991 A1    Apr. 30, 2026

Related U.S. Application Data

(63) Continuation-in-part of application No. 18/929,930, filed on Oct. 29, 2024.

(51) Int. Cl.
*G06F 3/041* (2006.01)
*G06F 3/044* (2006.01)
(52) U.S. Cl.
CPC ........ *G06F 3/04166* (2019.05); *G06F 3/0443* (2019.05); *G06F 3/0441* (2019.05)
(58) Field of Classification Search
CPC ... G06F 3/04166; G06F 3/0443; G06F 3/0441
See application file for complete search history.

(56) References Cited

U.S. PATENT DOCUMENTS

| | | | |
|---|---|---|---|
| 5,408,697 A | 4/1995 | Price et al. | |
| 8,482,339 B1 | 7/2013 | Giuroiu | |
| 9,237,628 B2 | 1/2016 | Shin et al. | |
| 10,692,448 B2 | 6/2020 | Kida et al. | |
| 11,119,606 B2 | 9/2021 | Shen | |
| 2006/0071672 A1 | 4/2006 | Tola et al. | |
| 2010/0238134 A1 | 9/2010 | Day et al. | |
| 2015/0015539 A1* | 1/2015 | Fotopoulos ........... | G06F 3/0446 |
| | | | 345/174 |
| 2016/0092029 A1 | 3/2016 | Kim et al. | |
| 2017/0090615 A1 | 3/2017 | Bohannon et al. | |

(Continued)

OTHER PUBLICATIONS

International Search Report, dated Jan. 8, 2026, in International Patent Application No. PCT/US2025/045293, filed Sep. 8, 2025.

*Primary Examiner* — Hong Zhou
(74) *Attorney, Agent, or Firm* — Leydig, Voit & Mayer, Ltd.

(57) ABSTRACT

A method for performing a reconstructed temperature stable profile sensing scheme is provided. The method comprises: based on driving a first subset of a plurality of electrodes, obtaining first resulting signals from a second subset of the plurality of electrodes; based on driving both the first subset and the second subset of the plurality of electrodes, obtaining second resulting signals from the second subset of the plurality of electrodes; determining a reconstructed temperature stable profile based on a mutual capacitance sensing profile associated with the first resulting signals, an absolute capacitance sensing (ABS) profile associated with the second resulting signals, and a reconstructed temperature stable parameter; and performing object detection based on the reconstructed temperature stable profile.

20 Claims, 9 Drawing Sheets

(56)             References Cited

U.S. PATENT DOCUMENTS

| | | | |
|---|---|---|---|
| 2017/0285794 A1* | 10/2017 | Tanemura | ......... G06F 3/041662 |
| 2017/0285797 A1* | 10/2017 | Shepelev | ......... G06F 3/041662 |
| 2020/0233531 A1* | 7/2020 | Weinerth | ............. G06F 3/0442 |
| 2021/0407411 A1 | 12/2021 | Yang et al. | |
| 2022/0206626 A1 | 6/2022 | Jang et al. | |
| 2023/0112523 A1 | 4/2023 | Cho et al. | |
| 2024/0060800 A1 | 2/2024 | Shen et al. | |

* cited by examiner

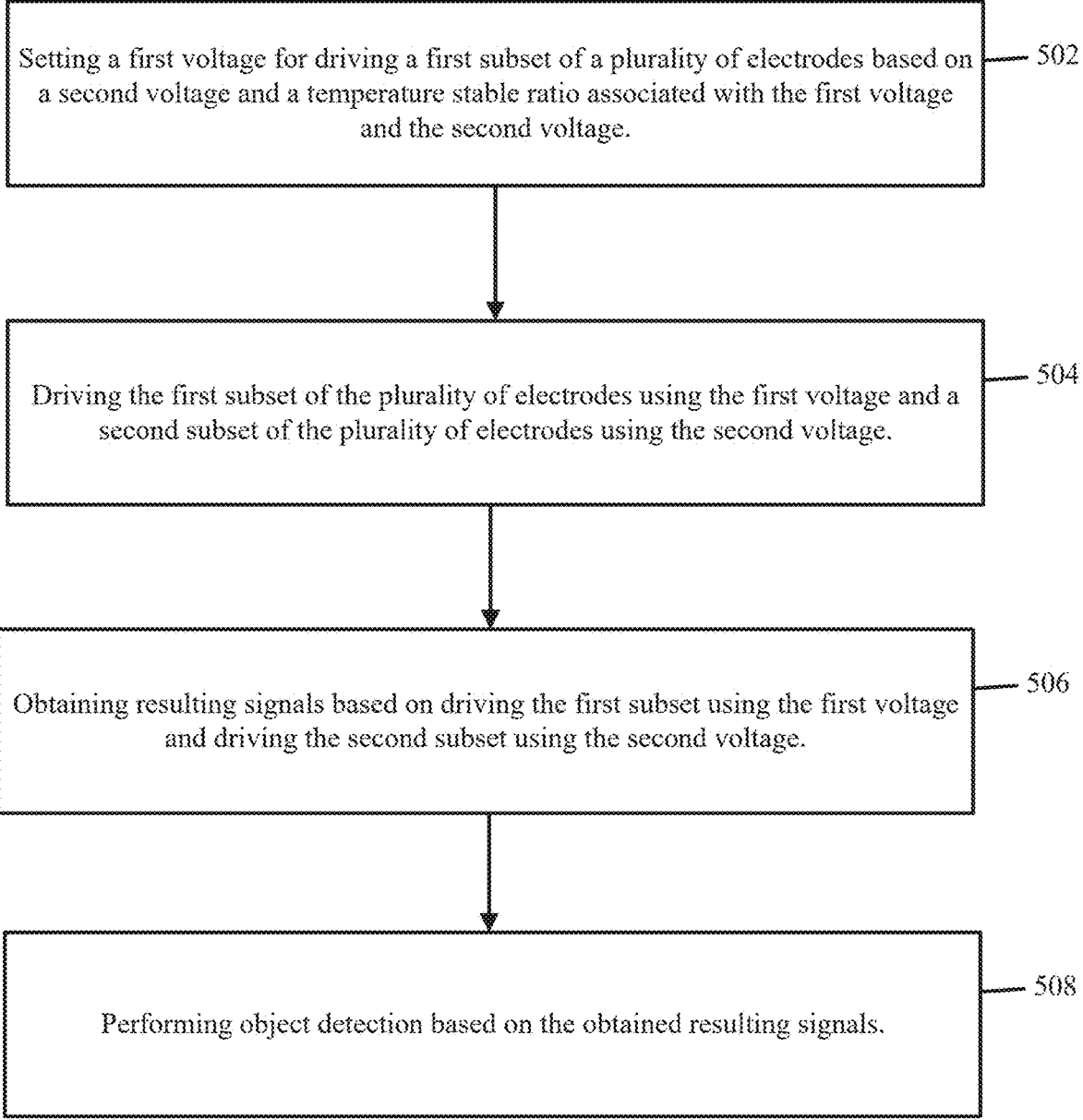

502 Setting a first voltage for driving a first subset of a plurality of electrodes based on a second voltage and a temperature stable ratio associated with the first voltage and the second voltage.

504 Driving the first subset of the plurality of electrodes using the first voltage and a second subset of the plurality of electrodes using the second voltage.

506 Obtaining resulting signals based on driving the first subset using the first voltage and driving the second subset using the second voltage.

508 Performing object detection based on the obtained resulting signals.

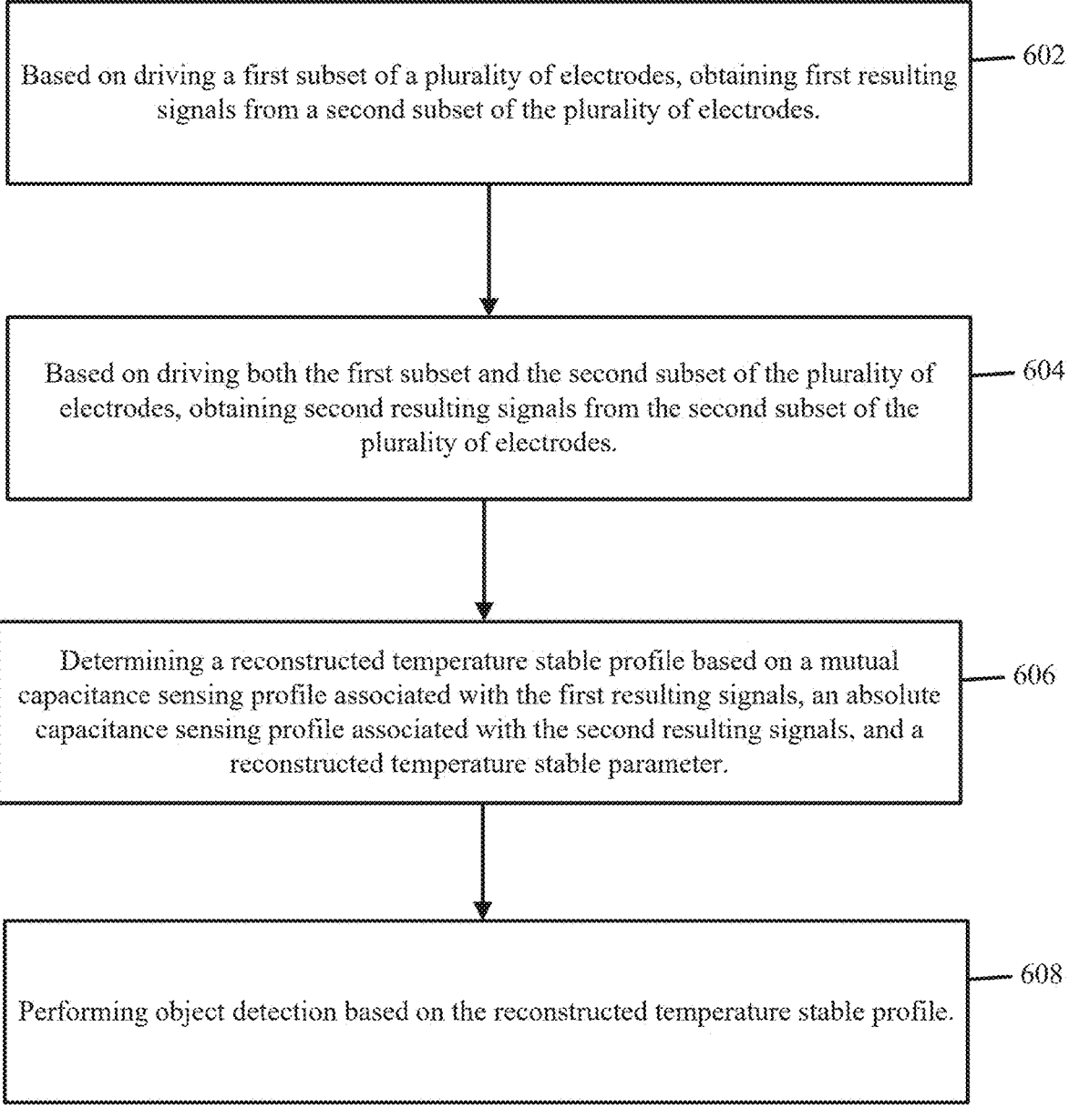

Based on driving a first subset of a plurality of electrodes, obtaining first resulting signals from a second subset of the plurality of electrodes. — 602

Based on driving both the first subset and the second subset of the plurality of electrodes, obtaining second resulting signals from the second subset of the plurality of electrodes. — 604

Determining a reconstructed temperature stable profile based on a mutual capacitance sensing profile associated with the first resulting signals, an absolute capacitance sensing profile associated with the second resulting signals, and a reconstructed temperature stable parameter. — 606

Performing object detection based on the reconstructed temperature stable profile. — 608

SENSING SYSTEM AND METHOD TO PERFORM TEMPERATURE STABLE PROFILE SENSING

CROSS-REFERENCE TO RELATED APPLICATIONS

This patent application is a continuation-in-part of U.S. patent application Ser. No. 18/929,930, filed Oct. 29, 2024, the entire contents of which is hereby incorporated by reference in its entirety.

TECHNICAL FIELD

This disclosure relates generally to electronic devices, and more specifically, to capacitive sensors and capacitive sensing.

BACKGROUND

Input devices, including capacitive sensor devices (e.g., touchpads or touch sensor devices), are widely used in a variety of electronic systems. A capacitive sensor device may include a sensing region, often demarked by a surface (e.g., display screen), in which the capacitive sensor device determines the presence, location and/or motion of one or more input objects. Capacitive sensor devices may be used to provide interfaces for the electronic system. For example, capacitive sensor devices may be used as input devices for larger computing systems (e.g., opaque touchpads integrated in, or peripheral to, notebook or desktop computers). Capacitive sensor devices are also often used in smaller computing systems (e.g., touch screens integrated in cellular phones). Capacitive sensor devices may also be used to detect input objects (e.g., finger, styli, pens, fingerprints, etc.).

Capacitive sensor devices may include capacitive sensors, which may be sensitive to temperature changes. Currently, regardless of the temperature of the environment, the capacitive sensor devices may be configured to operate the same to detect an input object such as a user's finger. However, given that capacitive sensors are sensitive to temperature, a ghost touch may occur, which is when the capacitive sensor devices detect (or continue to detect) an object even when the user removes their finger from the sensing region. For instance, when operating in a cold environment (e.g., negative twenty degrees Celsius), an input object such as the user's finger may be placed on a touch device and remain there for a period of time, which may heat-up the touch device. After the user removes the finger, the touch device may be unable to detect this removal due to the temperature sensitivity of the capacitive sensor. Therefore, conventional capacitive sensor devices may have difficulty accurately detecting input objects in certain environments such as in hot or cold environments.

SUMMARY

This summary is provided to introduce a selection of concepts in a simplified form that are further described below. This summary is not intended to necessarily identify key features or essential features of the present disclosure. The present disclosure may include the following various aspects and examples.

In an exemplary embodiment, the present disclosure provides a method for performing a reconstructed temperature stable profile sensing scheme. The method comprises:

based on driving a first subset of a plurality of electrodes, obtaining first resulting signals from a second subset of the plurality of electrodes; based on driving both the first subset and the second subset of the plurality of electrodes, obtaining second resulting signals from the second subset of the plurality of electrodes; determining a reconstructed temperature stable profile based on a mutual capacitance sensing profile associated with the first resulting signals, an absolute capacitance sensing (ABS) profile associated with the second resulting signals, and a reconstructed temperature stable parameter; and performing object detection based on the reconstructed temperature stable profile.

In another exemplary embodiment, the present disclosure provides an input device for performing a reconstructed temperature stable profile sensing scheme. The input device comprises: a plurality of electrodes; and a processing system configured to: based on driving a first subset of the plurality of electrodes, obtain first resulting signals from a second subset of the plurality of electrodes; based on driving both the first subset and the second subset of the plurality of electrodes, obtain second resulting signals from the second subset of the plurality of electrodes; determine a reconstructed temperature stable profile based on a mutual capacitance sensing profile associated with the first resulting signals, an absolute capacitance sensing (ABS) profile associated with the second resulting signals, and a reconstructed temperature stable parameter; and perform object detection based on the reconstructed temperature stable profile.

In yet another exemplary embodiment, the present disclosure provides a non-transitory computer-readable medium having processor-executable instructions stored thereon for performing a reconstructed temperature stable profile sensing scheme. The processor-executable instructions, when executed, facilitating performance of the following: based on driving a first subset of a plurality of electrodes, obtaining first resulting signals from a second subset of the plurality of electrodes; based on driving both the first subset and the second subset of the plurality of electrodes, obtaining second resulting signals from the second subset of the plurality of electrodes; determining a reconstructed temperature stable profile based on a mutual capacitance sensing profile associated with the first resulting signals, an absolute capacitance sensing (ABS) profile associated with the second resulting signals, and a reconstructed temperature stable parameter; and performing object detection based on the reconstructed temperature stable profile.

Further features and aspects are described in additional detail below with reference to the FIGs.

BRIEF DESCRIPTION OF DRAWINGS

FIG. 5 depicts an exemplary flowchart for performing temperature stable profile sensing according to one or more examples of the present disclosure.

FIG. 6 depicts an exemplary flowchart for performing reconstructed temperature stable profile sensing according to one or more examples of the present disclosure.

DETAILED DESCRIPTION

Figure 1:
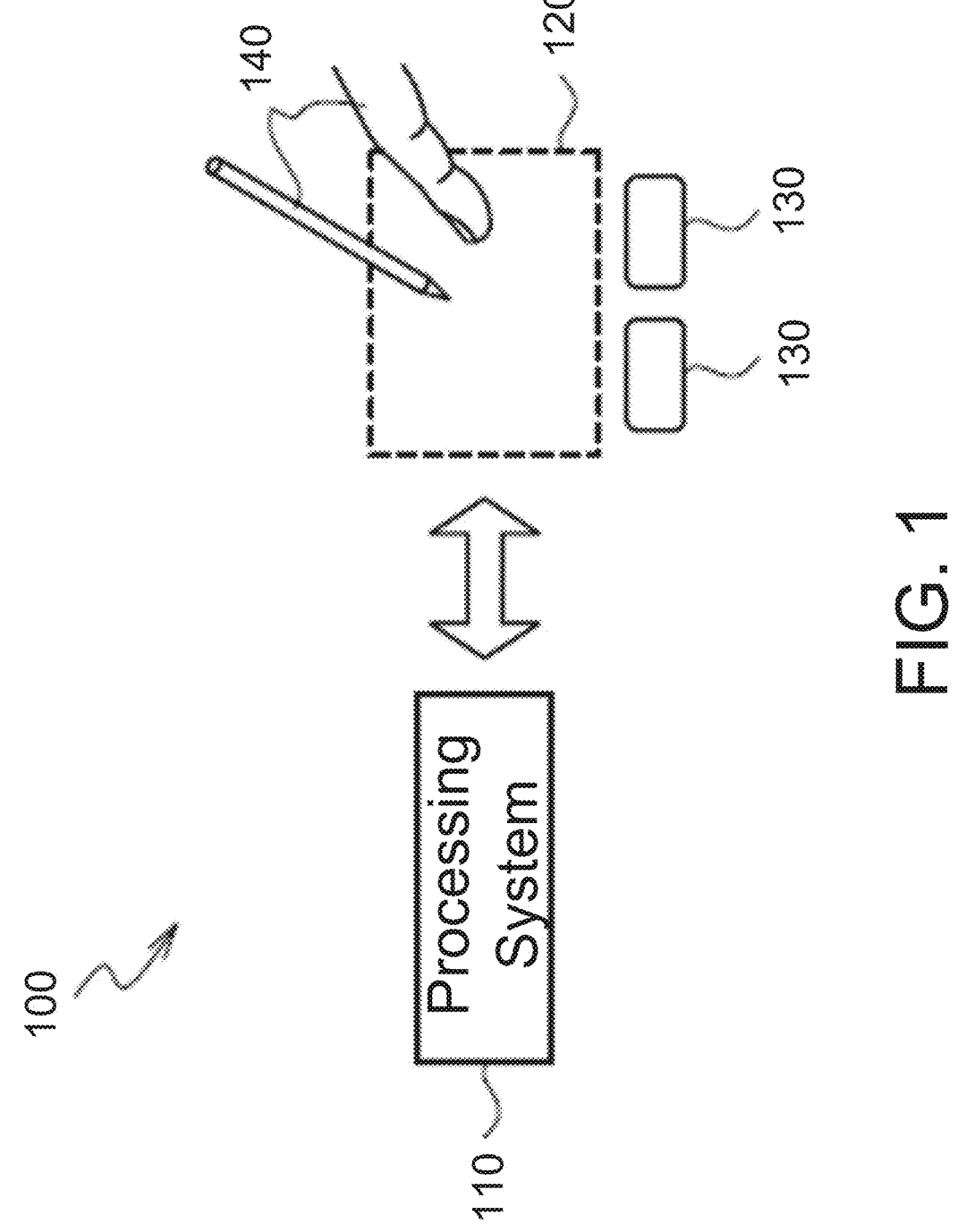
FIG. 1 depicts a schematic block diagram of an exemplary input device according to one or more examples of the present disclosure.

The drawings and the following detailed description are merely exemplary in nature, and are not intended to limit the disclosed technology or the application and uses of the disclosed technology. Furthermore, there is no intention to be bound by any expressed or implied theory presented in the preceding technical field, background, or the following detailed description.

In the following detailed description of various examples of the present disclosure, numerous details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description of sensor patterns relies on terminology such as "horizontal", "vertical", "top", "bottom", and "under" to clearly describe certain geometric features of the sensor patterns. The use of these terms is not intended to introduce a limiting directionality. For example, the geometric features may be rotated to any degree, without departing from the disclosure. Further, while patterns of certain sizes are shown in the drawings, the patterns may extend and/or repeat without departing from the disclosure. For example, the use of the term columns and vertical direction is to distinguish between rows and the horizontal direction, respectively. If the input device is rectangular, any direction along the surface may be designated as the vertical direction by which a column extends and any substantially orthogonal direction along the surface may be designated as a vertical direction along which the row extends.

Various examples of the present disclosure provide input devices and processes for performing temperature stable profile sensing. For instance, instead of driving the electrodes using a mutual capacitance sensing scheme or an absolute capacitance sensing scheme, the input device may drive the electrodes using a temperature stable profile sensing scheme. For instance, to perform temperature stable profile sensing, a processing system of the input device may drive the transmitter and receiver electrodes using a first voltage (e.g., a transmitter voltage ($V_{Tx}$)) and a second voltage (e.g., a modulation voltage ($V_{mod}$)). The first and second voltages may be selected (e.g., determined) using a ratio that is based on features of the input device itself. By performing temperature stable profile sensing, various benefits and/or advantages may be achieved such as, but not limited to, ensuring accurate input object detection in a variety of environments (e.g., hot and cold environments), resetting a baseline to avoid ghost touch or missing touch, replacing other sensing schemes (e.g., absolute capacitance sensing scheme), and/or other benefits.

FIG. 1 depicts a schematic block diagram of an exemplary input device 100 according to one or more examples of the present disclosure. The example input device 100 may be configured to provide input to an electronic system. As used herein, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, and/or alternatively, the electronic system may be a host or a slave to the input device. The electronic system may also be referred to as an electronic device.

The input device 100 may be implemented as a physical part of the electronic system, or may be physically separate from the electronic system. In some examples, the electronic system may be referred to as a host device. As appropriate, the input device 100 may communicate with parts of the electronic system using any one or more of the following: buses, networks, and other wired or wireless interconnections. Examples include I2C, SPI, PS/2, Universal Serial Bus (USB), BLUETOOTH, RF, and IRDA.

In FIG. 1, the input device 100 is shown as a capacitive sensor device configured to sense input provided by one or more input objects 140 in a sensing region 120. Example input objects 140 include fingers and styli, as shown in FIG. 1. An exemplary capacitive sensor device may be a touchpad, a touch screen, a touch sensor device, and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from example to example. In some examples, the sensing region 120 extends from a surface of the input device 100 in one or more directions into space until signal-to-noise ratios prevent sufficiently accurate object detection. The distance to which this sensing region 120 extends in a particular direction, in various examples, may be on the order of less than a millimeter, millimeters, centimeters, or more, and may vary significantly with the type of sensing technology used and the accuracy desired. Thus, some examples sense input that comprises: no contact with any surfaces of the input device 100; contact with an input surface, e.g., a touch surface, of the input device 100; contact with an input surface of the input device 100 coupled with some amount of applied force or pressure; and/or a combination thereof. In various examples, input surfaces may be provided by surfaces of casings within which the sensor electrodes reside, by face sheets applied over the sensor electrodes or any casings, etc. In some examples, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may utilize capacitive sensing, and may further utilize elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

In some instances, the input device 100 may be operating in a variety of environments such as a cold environment or a hot environment. When operating in a cold environment such as, for example, negative twenty degrees Celsius, an input object 140 such as a user's finger may be placed on the sensing region 120, and remain on the sensing region 120 for a period of time. The user's finger may heat-up the sensor electrodes of the sensing region 120, and the sensor electrodes may be sensitive to the temperature. For instance, the capacitive measurements obtained by the sensor electrodes may change depending upon the temperature of the sensing region 120 and/or of the sensor electrodes. Thus, due to the user's finger being placed and remaining on the sensing region 120, the capacitance measurements obtained by the sensor electrodes may deviate from baseline even when the user's finger has been removed from the sensing region 120. This deviation may cause the input device 100 to be unable to determine whether the user's finger has been removed from the sensing region 120, which results in a ghost touch. Similarly, in hot environments (e.g., fifty degrees Celsius), a user's finger may actually cool the sensing region 120 and/or the sensor electrodes. This may also cause a deviation from baseline and may prevent the input device 100 from being able to determine whether the user's finger has been removed from the sensing region 120. In another example, when a user moves the input device 100 from a hot environment to a cold environment (e.g., during a stress test such as taking the input device 100 from a sixty five degrees Celsius environment to a negative twenty degrees Celsius environment or during a hot summer day, when moving the input device 100 from outside to an interior that is being supplied with air conditioning (A/C)), a similar phenomenon may occur. Thus, as will be described below, the input device 100 may utilize a temperature stable profile sensing scheme to ensure accurate detections of input objects on the sensing region 120.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various examples, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations, sensing elements may be formed of a substantially transparent metal mesh (e.g., a reflective or absorbing metallic film patterned to minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and the cathode electrode). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more examples, the first and second groups may be orthogonal axes to each other. Further, in various examples, the absolute capacitance measurement may comprise a profile (e.g., ABS profile) of the input object couplings accumulated along one axis and projected onto the other. In various examples, a modulated input object (e.g., a powered active stylus) may be received by the orthogonal electrode axes without modulation of the corresponding electrodes (e.g., relative to a system ground). In such an example, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various examples, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes. In some examples, the processing system 110 also comprises electronically-readable instructions, such as firmware code, software code, and/or the like. In some examples, components composing the processing system 110 are located together, such as near sensing element(s) of the input device 100. In other examples, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another example, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some examples, the processing system 110 is dedicated to implementing the input device 100. In other examples, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various examples, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some examples, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some examples, the processing system 110 provides information about the input (or lack of input) to some part of the electronic system, e.g., to a central processing system of the electronic system that is separate from the processing system 110, if such a separate central processing system exists. In some examples, some part of the electronic system processes information received from the processing system 110 to act on user input, such as to facilitate a full range of actions, including mode changing actions and GUI actions.

For instance, in some examples, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for finite impulse response (FIR) digital or infinite impulse response (IIR) switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some examples, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some examples, the input device 100 may be implemented with no other input components.

In some examples, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more examples, the input device 100 may comprise substantially transparent sensor electrodes (e.g., indium tin oxide (ITO), metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For instance, some examples may utilize some of the same electrical components for displaying and sensing. As another example, the display panel may be operated in part or in total by the processing system 110.

A cathode electrode of an OLED display may provide a low impedance screen between one or more display electrodes and the sensor electrodes which may be separated by a thin encapsulation layer. For example, the encapsulation layer may be about 10 micrometers. Alternatively, the encapsulation layer may be less than 10 micrometers or greater than 10 micrometers. Further, the encapsulation layer may be comprised of a pin hole free stack of conformal organic and inorganic dielectric layers.

It should be understood that while many examples of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the examples of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As mentioned above, the input device 100 may include sensor electrodes. The sensor electrodes may be and/or include any type, number, and/or configuration of sensor electrodes including, but not limited to, different types, numbers, and/or configurations of bar electrodes (e.g., horizontal and vertical bar electrodes).

Figure 2:
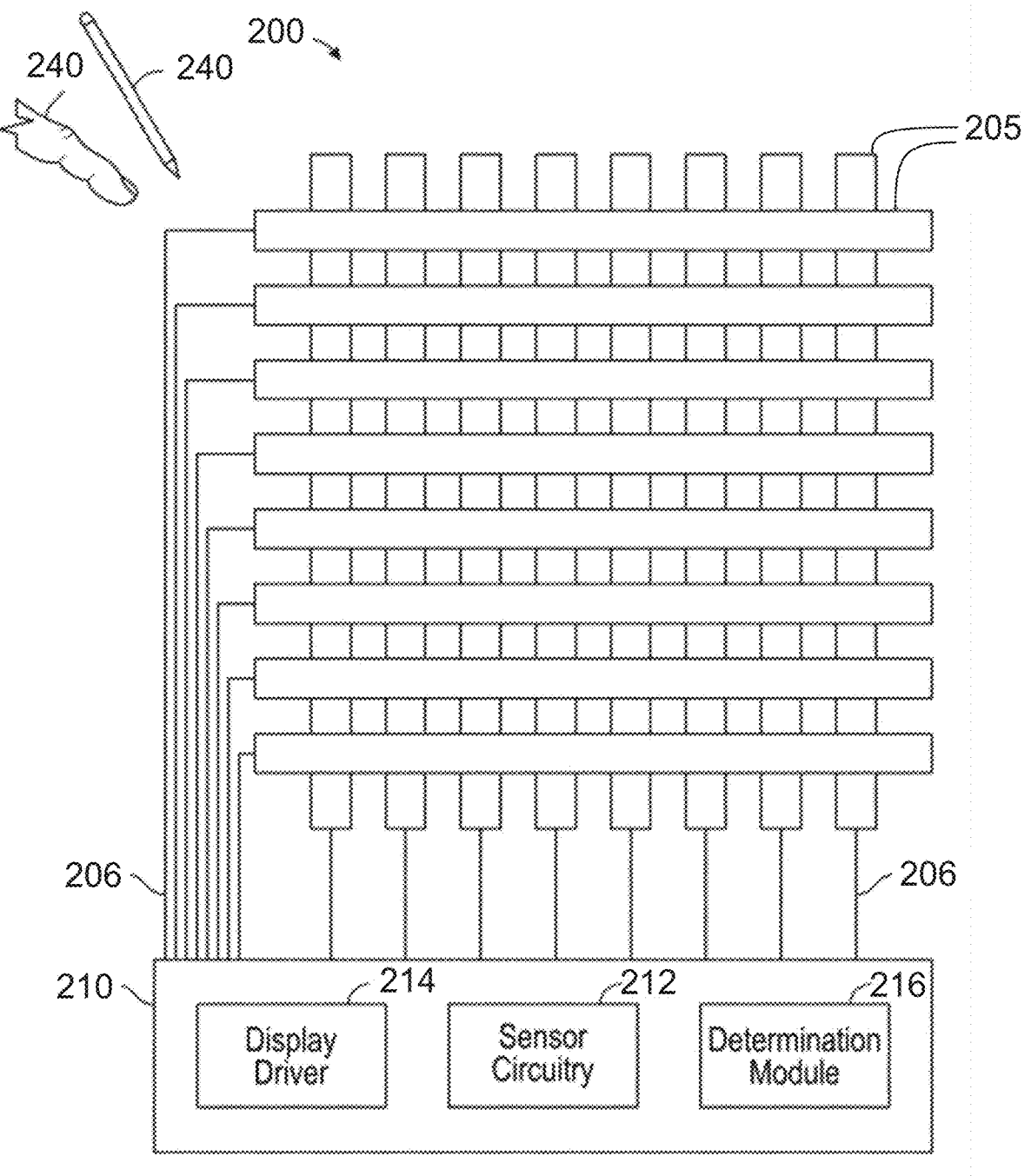
FIG. 2 depicts an exemplary input device having bar electrodes according to one or more examples of the present disclosure.

FIG. 2 depicts an example input device 200 having bar sensor electrodes 205 according to one or more examples of the present disclosure. For instance, the input device 200 may be an example of the input device 100 of FIG. 1 where the input device 100 includes bar sensor electrodes 205 (e.g., horizontal and vertical sensor electrodes). However, as mentioned above, FIG. 2 is merely an example and in other variations, the input device 100 may include other electrode types, numbers, and/or configurations.

Referring to FIG. 2, the input device 200 may be configured to provide input to an electronic system such as the electronic systems described above. The input device 200 includes a processing system 210 and sensor electrodes 205. The processing system 210 may be the same processing system 110 that is shown in FIG. 1 and described above. The processing system 210 operates the sensor electrodes 205 to detect one or more input objects 240 in a sensing region of the input device 200.

The sensor electrodes 205 are coupled to the processing system 210 via a plurality of routing traces 206. The exemplary pattern of the sensor electrodes 205 illustrated in FIG. 2 comprises sensor electrodes 205 disposed in a plurality of rows and columns (e.g., vertical and horizontal bar sensor electrodes). However, as mentioned above, the sensor electrodes 205 may be arranged in other patterns and/or arrangement. In some instances, the sensor electrodes 205 may have a shape that is circular, rectangular, diamond, star, square, nonconvex, convex, nonconcave, or other suitable geometry.

The sensor electrodes 205 are disposed in one or more layers. In some examples, the sensor electrodes 205 may be disposed in a common layer. For example, the sensor electrodes 205 are disposed on a first side of a common substrate. In other examples, the sensor electrodes 205 are disposed in two or more layers. For example, a portion of the sensor electrodes 205 may be disposed on a first layer and another portion of the sensor electrodes may be disposed on a second layer. The first and second layers may be disposed on different sides of a common substrate, or disposed on different substrates. Further, one or more of the sensor electrodes 205 overlaps at least one other of the sensor electrodes 205. In some examples, the sensor electrodes 205 are ohmically isolated from each other. That is, one or more insulators separate the sensor electrodes and prevent the sensor electrodes from electrically shorting.

The processing system 210 is configured to operate the sensor electrodes 205 to detect one or more input objects 240 in the sensing region of the input device 200. The processing system 210 fully or partially resides in one or more integrated circuit (IC) chips. The sensor circuitry 212 is coupled to the sensor electrodes 205 via the routing traces 206. The sensor circuitry 212 is configured to drive the sensor electrodes 205 with sensing signals to detect one or more input objects 240 in the sensing region of the input device 200. The sensing signals include mutual capacitance sensing signals, absolute capacitive sensing signals, temperature stable profile sensing signals, and/or other types of sensing signals.

The sensor circuitry 212 includes digital and/or analog circuitry. For example, the sensor circuitry 212 comprises transmitter (or driver) circuitry configured to drive sensing signals onto the sensor electrodes 205 and receiver circuitry to receive resulting signals from the sensor electrodes 205. The receiver circuitry includes one or more receiver channels. Each of the receiver channels include analog and/or digital circuitry. For example, each of the receiver channels includes at least one or more of an operational amplifier, sample and hold circuitry, one or more filters, an analog-to-digital converter (ADC), and/or a demodulator, among others. The receiver channels are described below.

In some examples, the sensor circuitry 112 drives a first one or more of the sensor electrodes 205 with a mutual capacitance sensing signal and receives a resulting signal with a second one or more of the sensor electrodes 205 to operate the sensor electrodes 205 for mutual capacitance sensing. Operating the sensor electrodes 205 for mutual capacitance sensing detects changes in capacitive coupling between sensor electrodes driven with a mutual capacitance sensing signal and sensor electrodes operated as receiver electrodes. The capacitive coupling may be reduced when an input object (e.g., the input object 240) coupled to ground approaches the sensor electrodes.

The mutual capacitance sensing signal is a periodic or aperiodic signal that varies between two or more voltages. Further, the mutual capacitance sensing signal may have a frequency between, for example, 20 kilohertz (kHz) and 1 megahertz (MHz). In other examples, other frequencies may be utilized. For example, frequencies less than 20 kHz and frequencies greater than 1 MHz may be utilized. The mutual capacitance sensing signal may have a peak-to-peak amplitude in a range of, for example, about 1 volt (V) to about 10 V. However, in other examples, the mutual capacitance sensing signal may have other peak-to-peak amplitudes. Additionally, the mutual capacitance sensing signal may have a square waveform, a sinusoidal waveform, triangular waveform, a trapezoidal waveform, or a saw-tooth waveform, among others.

In some instances, operating the sensor electrodes 205 to receive resulting signals comprises holding the sensor electrodes 205 at a substantially constant voltage or modulating the sensor electrodes 205 relative to the mutual capacitance sensing signal. The resulting signals include effects corresponding to one or more mutual capacitance sensing signals, and/or to one or more sources of environmental interference, e.g., other electromagnetic signals.

The sensor circuitry 212 additionally, or alternatively, operates the sensor electrodes 205 for absolute capacitive sensing by driving a first one or more of the sensor electrodes 205 with an absolute capacitive sensing signal and receiving a resulting signal with the driven sensor electrode (s). Operating the sensor electrodes 205 for absolute capacitive sensing detects changes in capacitive coupling between sensor electrodes driven with an absolute capacitive sensing signal and an input object (e.g., the input object 240). The capacitive coupling of the sensor electrodes 205 driven with the absolute capacitive sensing signal is altered when an input object (e.g., the input object 240) coupled to ground approaches the sensor electrodes.

The absolute capacitive sensing signal is a periodic or aperiodic signal that varies between two or more voltages. Further, the absolute capacitive sensing signal has a frequency between, for example, 20 kHz and 1 MHz. In other examples, other frequencies may be utilized. Additionally, the absolute capacitive sensing signal may have a square waveform, a sinusoidal waveform, triangular waveform, a trapezoidal waveform, or a saw-tooth waveform, among others. The absolute capacitive sensing signal may have a peak-to-peak amplitude in a range of, for example, about 1 V to about 10 V. However, in other examples, the absolute capacitive sensing signal may have other peak-to-peak amplitudes. Driving the sensor electrodes 205 with an absolute capacitive sensing signal comprises modulating the sensor electrodes 205.

Resulting signals received while performing absolute capacitive sensing comprise effects corresponding to one or more absolute capacitive sensing signals, and/or to one or more sources of environmental interference, e.g., other electromagnetic signals. The absolute capacitive sensing signal may be the same or different from the mutual capacitance sensing signal used to perform mutual capacitance sensing.

The determination module 216 receives the resulting signals from the sensor circuitry 212 and processes the resulting signals to determine changes in capacitive coupling of the sensor electrodes 205. Processing the resulting signals includes removing a baseline measurement from the resulting signals, filtering the resulting signals, performing hysteresis on the resulting signals, and combining the resulting signals, among others, to determine the changes in capacitive coupling of the sensor electrodes 205. The determination module 216 utilizes the changes in capacitive coupling of the sensor electrodes 205 to determine positional information of one or more input objects (e.g., the input object 240). For example, a capacitive image may be generated from the measurements corresponding to the changes in capacitive coupling of the sensor electrodes 205, and the determination module 216 determines positional information for an input object 240 from the capacitive image. Additionally, or alternatively, the measurements of changes in capacitive coupling of the sensor electrodes 205 are compared to one or more thresholds.

The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 240 in the sensing region of the input device 200. For example, successive capacitive images acquired over successive periods of time can be used to track the motion(s) of one or more input objects entering, exiting, and within the sensing region.

Figure 3:
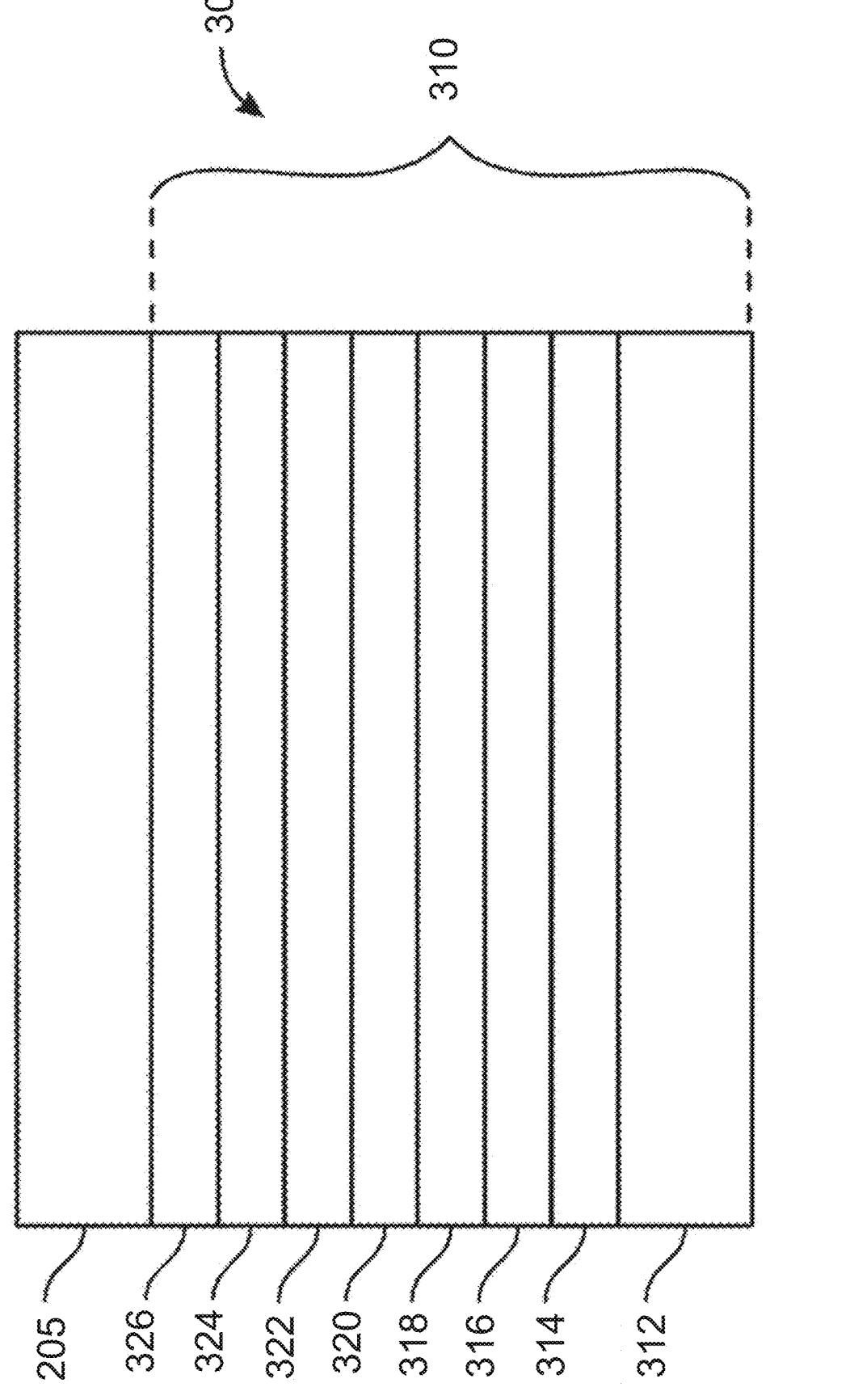
FIG. 3 depicts an exemplary display device according to one or more examples of the present disclosure.

The processing system 210 may additionally include a display driver 214. The display driver 214 may be associated with display electrodes for a display device, such as the display device 300 shown in FIG. 3. For example, FIG. 3 depicts a side view of an example display device 300 according to one or more examples of the present disclosure. The display device 300 may be used in connection with the input devices 100 and/or 200 of FIGS. 1 and 2.

For instance, the display driver 214 of FIG. 2 may be coupled to the display electrodes such as the data lines 314 and/or a cathode electrode 322 of the display device 300. The display driver 214 drives display update signals (e.g., subpixel data signals and/or reference electrode signals) onto the display electrodes to update subpixels of the display device. The display driver 214 includes source drivers having amplifier circuitry that are configured to drive subpixel data signals onto the data lines. Further, the display driver 214 communicates control signals to gate control circuitry of a display device to control driving of the gate lines such as gate lines 316 of FIG. 3 to control the selection of the subpixels of the display device.

As illustrated in FIG. 3, the sensor electrodes 205 are disposed over a display panel 310 of the display device 300. In the example depicted in FIG. 3, the display panel 310 is an organic light emitting diode (OLED) display panel. However, in other examples, the display panel 310 may be configured as other display types (e.g., liquid crystal displays (LCDs) or the like). The display panel 310 includes display electrodes that are driven to update subpixel electrodes 318 of the display panel 310. The display electrodes include data lines 314 and gate lines 316. Additionally, the display electrodes may include emission control lines (not shown) configured to control the brightness of the subpixels of the display panel 310.

The data lines 314 are coupled to the display driver 214 and the gate lines 316 are coupled to the gate selection circuitry (not shown). Each of the subpixel electrodes 318 is coupled to one of the gate lines 316 and one of the data lines 314. Further, in one or more examples, each of the subpixel electrodes 318 is coupled to an emission control line. The subpixel electrodes 318 may be referred to as anode electrodes in embodiments where the display device 300 is an OLED display device.

The data lines 314 and gate lines 316 are disposed in metal layers disposed on the substrate 312. The data lines 314 are disposed in a metal layer between the substrate 312 and the metal layer comprising the gate lines 316. Alternatively, the gate lines 316 are disposed in a metal layer between the substrate 312 and the data lines 314.

As is described above, the display driver 214 drives subpixel data signals onto the data lines 314 to update the subpixel electrodes 318. Gate select and gate deselect signals are driven onto the gate lines 316 by the gate selection circuitry to select (activate) and deselect (deactivate) corresponding subpixel electrodes 318 for updating.

The display panel 310 additionally includes organic material 320, a cathode electrode 322, display layers 324, and an encapsulation layer 326. The cathode electrode 322 is a sheet of resistive material that overlaps the subpixel electrodes 318. The cathode electrode 322 is coupled with and driven by the display driver 214 to supply a low impedance reference voltage. In examples where the display panel 310 is an LCD panel, the cathode electrode 322 is replaced with a common voltage (Vcom) electrode layer. Further, the cathode electrode 322 (or the Vcom electrode layer) may be referred to as a reference electrode layer.

The substrate 312 is a flexible substrate. Alternatively, the substrate 312 may be a rigid substrate. The display layers 324 include one or more polarizers and/or a color filter glass, among others. As illustrated, the sensor electrodes 205 are disposed on the encapsulation layer 326. In examples where the display device 300 comprises a lens, the sensor electrodes 205 may be disposed on the lens instead of the encapsulation layer 326. The lens may be disposed over the encapsulation layer 326 or included instead of the encapsulation layer 326.

The display driver 214 is configured to update the subpixel electrodes 318 to update an image displayed on the display panel 310 during display frames. The display frames may be updated, or refreshed, once about every 16 milliseconds (ms), generating a display refresh rate of about 60 hertz (Hz). In other examples, other display refresh rates may be employed. For example, the display refresh rate may be 90 Hz, 120 Hz, 140 Hz, or greater.

With further reference to FIG. 2, the sensor circuitry 212 is configured to drive the sensor electrodes for capacitive sensing during a capacitive frame (e.g., a frame) at a capacitive frame rate. In one example, during each capacitive frame each sensor electrode 205 is operated for absolute capacitive sensing. Further, each capacitive frame may include multiple periods during which different sensor electrodes 205 are operated for absolute capacitive sensing.

The "capacitive frame rate" (the rate at which successive capacitive images are acquired) may be the same or different from that of the "display frame rate" (the rate at which the display image is updated). The capacitive frame rate is an integer multiple of the display frame rate. In other examples, the capacitive frame rate is a fractional multiple of the display frame rate. Further, the capacitive frame rate is any fraction or multiple of the display frame rate. For example, the capacitive frame rate may be a rational fraction of the display rate (e.g., 1/2, 2/3, 1, 3/2, 2). The display frame rate changes while the capacitive frame rate remains constant. Alternatively, the display frame rate remains constant while the capacitive frame rate is increased or decreased. The capacitive frame rate may be unsynchronized from the display refresh rate or the capacitive frame rate may be a non-rational fraction of the display rate to minimize interference "beat frequencies" between the display updating and the input sensing.

Capacitive sensing (or input sensing) and display updating may occur during at least partially overlapping periods. For example, the sensor circuitry 212 is configured to operate the sensor electrodes 205 for capacitive sensing during a period overlapping with when the display driver 214 operates the gate lines 316 and data lines 314 to update an image displayed by the display panel 310. For example, updating the display panel 310 and operating the sensor electrodes 205 for capacitive sensing may be asynchronous with each other. Further, updating the display panel 310 and operating the sensor electrodes 205 for capacitive sensing may or may not be synchronized with each other.

Alternatively, or additionally, updating the display panel 310 and operating the sensor electrodes 205 for capacitive sensing may occur during non-overlapping periods. For example, updating the display panel 310 may occur during display update periods and operating the sensor electrodes 205 for capacitive sensing may occur during non-display update periods. The non-display update periods may be a blanking period that occurs between the last line of a display frame and the first line of a following display frame (e.g., during a vertical blanking period). Further, the non-display update periods may occur between display line update periods for two consecutive display lines of a display frame and are at least as long in time as the display line update period. In such examples, the non-display update period may be referred to as a long horizontal blanking period or long h-blanking period, where the blanking period occurs between two display line updating periods within a display frame and is at least as long as a display line update period.

Figure 4:
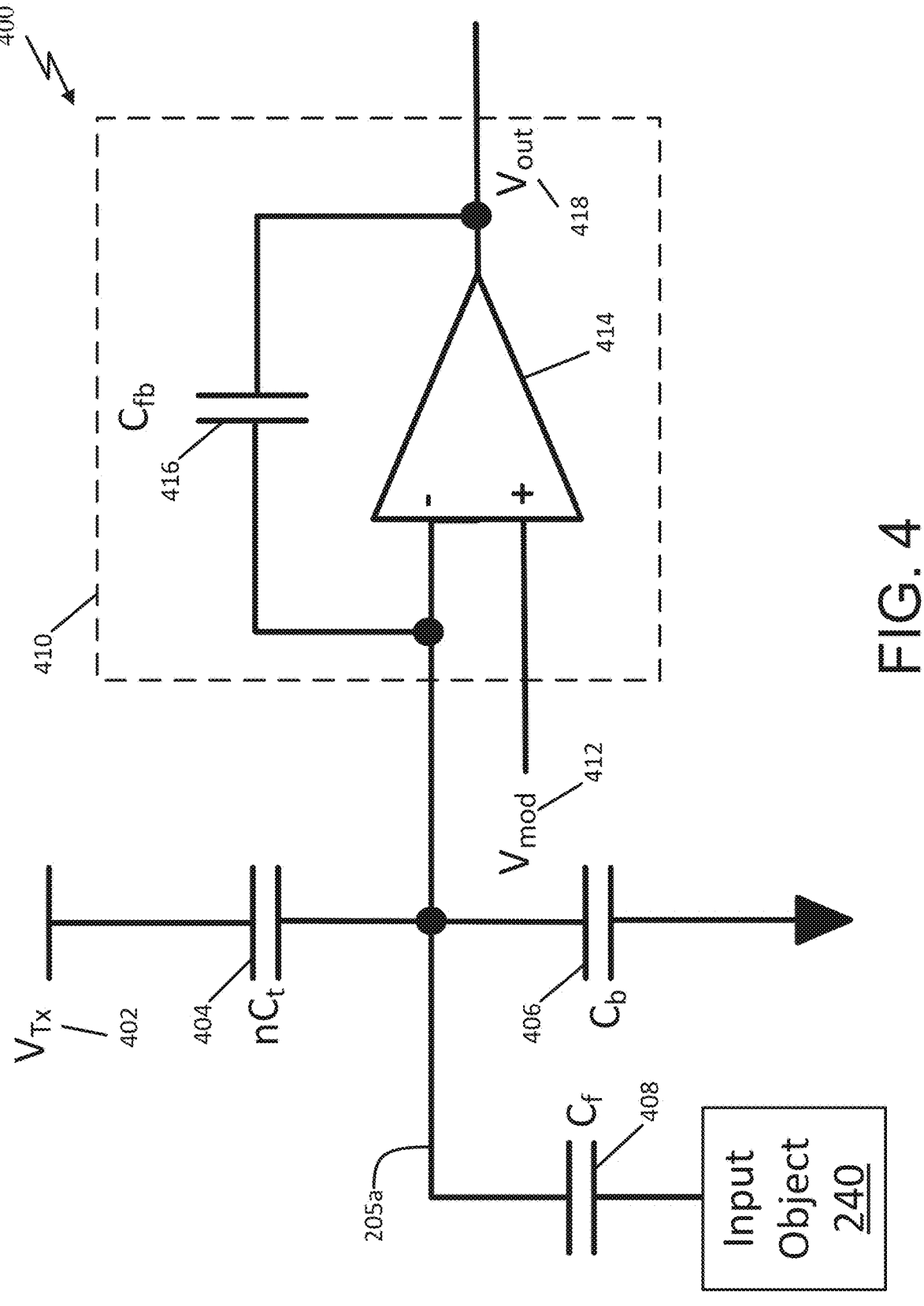
FIG. 4 depicts exemplary circuitry of an input device according to one or more examples of the present disclosure.

FIG. 4 depicts exemplary circuitry 400 of an input device according to one or more examples of the present disclosure. For instance, the circuitry 400 may be used to detect an input object such as input object 240. The circuitry 400 may include multiple elements including a transmitter voltage ($V_{Tx}$) 402, a capacitance 404 that is based on the mutual capacitance (Ct) and "n", a background capacitance (Cb) 406, an input object capacitance (Cf) 408, an input object 240, and a receiver channel 410. The receiver channel 410 may include a modulation voltage ($V_{mod}$) 412, a feedback capacitance (Cfb) 416, and an output voltage (Vout) 418. "n" refers to the number of transmitter electrode and receiver electrode cross points for each receiver electrode. The mutual capacitance Ct is the capacitance (e.g., capacitive coupling) between a transmitter electrode and a receiver electrode such as the capacitance between a transmitter and receiver sensor electrode 205 of FIG. 2.

For instance, as mentioned above, the sensor circuitry 212 may drive the sensor electrodes 205 using sensing signals (e.g., drive the sensor electrodes 205 using one or more voltages), and may obtain resulting signals from the sensor electrodes 205. For example, depending on the sensing scheme, the sensor circuitry 212 may drive the sensor electrodes 205 using a first voltage such as the transmitter voltage 402 and/or a second voltage such as a modulation voltage 412.

Based on driving the sensor electrodes 205 using the transmitter voltage 402, a capacitance (e.g., the mutual capacitance Ct) may be formed. The mutual capacitance may be based on a capacitance of a single transmitter/receiver electrode combination. However, the receiver electrode may have a plurality of cross points with a plurality of transmitter electrodes. For instance, referring to FIG. 2, if the receiver electrode is a horizontal electrode, the receiver electrode may include a plurality of cross points (e.g., intersection points) for a plurality of (vertical) transmitter electrodes (e.g., eight cross points for the eight transmitter electrodes). Thus, "n" for this example would equal eight, and the capacitance 404 may be equal to eight multiplied by the mutual capacitance. The input device 200 may include any number of horizontal and vertical electrodes, and thus, "n" may be equal to any number such as five, ten, twenty, and so on.

The background capacitance 406 may be formed between a sensor electrode from FIG. 2 (e.g., the sensor electrode 205a, which is shown in FIG. 4 and may be one of the sensor electrodes 205 shown in FIG. 2) and the one or more proximate conductive elements. For example, the background capacitance 406 may be formed between the sensor electrode 205a and one or more display electrodes of the display panel 310. For example, the background capacitance 406 may be formed between the sensor electrode 205a and a cathode layer or cathode electrode 322 (e.g., a sheet of resistive material that overlaps the subpixel electrodes 318), one or more subpixel electrodes 318, one or more gate lines 316, and/or one or more data lines 314 in examples employing an OLED display device. In examples employing an LCD display device, the background capacitance 406 may be formed between a common voltage electrode, one or more subpixel electrodes, one or more gate lines, and/or one or more data lines of an LCD device. The capacitance value of the background capacitance 406 may vary based on the distance between the sensor electrode 205a and the conductive element (e.g., a display electrode or other conductive element). For example, as the distance between the sensor electrodes 205 and the display electrodes increases, the capacitance value of the background capacitance 406 may decrease. The above are merely examples of the background capacitance 406, and the background capacitance 406 may be and/or include any capacitance that is not from the input object 240.

The input object capacitance (Cf) 408 may be the capacitance formed between the input object 240 and the sensor electrode 205a. As mentioned above, the sensor electrode 205a may be an electrode from the sensor electrodes 205 shown in FIG. 2. The input object capacitance 408 alters the capacitance of the sensor electrode 205a to free space, altering the amount of charge driven onto the sensor electrode 205a. Thus, by measuring the resulting signal, the input object capacitance 408 may be determined. Further, as the input object capacitance 408 varies, the amount of charge driven onto the sensor electrode 205a varies accordingly. The input object capacitance 408 may vary based on the distance (e.g., horizontal and/or vertical distance) between the sensor electrode 205a and the input object 240, the size of the input object 240, or both. For example, the input object capacitance 408 decreases as the distance between the input object 240 and the sensor electrode 205a increases, and increases as the distance between the input object 240 and the sensor electrode 205a decreases. Further, the input object capacitance 408 varies based on the size, shape, and/or layout of the sensor electrodes 205. For example, as the size of the input object 240 and/or the size of the sensor electrode 205a increases, the input object capacitance 408 increases.

The receiver channel 410 may be part of the sensor circuitry 212. For example, as mentioned above, the sensor circuitry 212 comprises transmitter (or driver) circuitry configured to drive sensing signals onto the sensor electrodes 205 and receiver circuitry to receive resulting signals from the sensor electrodes 205. The receiver circuitry includes one or more receiver channels such as the receiver channel 410. For instance, each sensor electrode 205 (e.g., each receiver electrode) may include and/or be associated with a receiver channel 410. As such, based on having twenty electrodes, the sensor circuitry 212 may include twenty receiver channels 410. As shown, the receiver channel 410 is associated with one sensor electrode 205a from the sensor electrodes 205 of FIG. 2. Each receiver channel 410 may include an operational amplifier 414 that accepts two inputs. The first input (e.g., the inverting input) may be based on the capacitances 404-408 and/or other elements of circuitry 400 (e.g., the transmitter voltage 402). The first input may further be provided to the feedback capacitor 416. The second input (e.g., the non-inverting input) may be the modulation voltage 412. The operational amplifier 414 is configured to output a resulting signal Vout 418, which may be used by the processing system 210 (e.g., the determination module 216) for one or more tasks and/or functions such as for detecting the presence of the input object 240. Thus, Vout 418 may be based on (e.g., includes the effects of) the mutual capacitance (e.g., the capacitance 404), the background capacitance 406, the input object capacitance 408, and/or other aspects of circuitry 400 such as the transmitter voltage 402 and the modulation voltage 412. When the input object 240 is absent (e.g., the user is not placing their finger or has removed their finger from the sensing region 120), the input object capacitance 408 may be zero, and might not influence Vout 418.

During different sensing schemes, the processing system 210 may drive the sensor electrodes 205 using different sensing signals that are based on the transmitter voltages 402 and the modulation voltages 412. For example, when performing the absolute capacitance sensing (ABS) scheme, the sensor circuitry 212 may drive the sensor electrodes 205 (e.g., the vertical electrodes and/or the horizontal electrodes shown in FIG. 2) using a transmitter voltage 402 and a modulation voltage 412 that are the same (e.g., same magnitude and/or waveform). For instance, as mentioned above, when performing the ABS scheme, the sensor circuitry 212 may drive a first subset of the sensor electrodes 205 and receive resulting signals from the same first subset. For example, when performing the ABS scheme, the sensor circuitry 212 may drive a first subset of electrodes such as the vertical electrodes with a first voltage (e.g., the transmitter voltage 402) and drive a second subset of electrodes such as the horizontal electrodes with a second voltage (e.g., the modulation voltage 412). The first and second voltages may be the same (e.g., the same magnitude and waveform). In other words, the sensor circuitry 212 may drive all of the sensor electrodes 205 using the same sensing signal (e.g., the first subset may be driven with the transmitter voltage 402 and the second subset may be driven with the modulation voltage 412, but the transmitter voltage 402 and the modulation voltage 412 are the same). Then, based on driving the sensor electrodes 205, the sensor circuitry 212 may receive resulting signals from the first subset of sensor electrodes 205 that were driven based on the transmitter voltage 402 (e.g., the vertical electrodes).

For the mutual capacitance sensing scheme, the sensor circuitry 212 may drive a first subset of sensor electrodes 205 (e.g., the vertical electrodes) using a sensing signal associated with the transmitter voltage 402 and the second subset of electrodes (e.g., the horizontal electrodes) with another voltage. For instance, in contrast to the ABS scheme where the modulation voltage 412 and the transmitter voltage 402 are the same, in the mutual capacitance sensing scheme, the processing system 210 may set the modulation voltage 412 to be a pre-defined voltage. For example, for the mutual capacitance sensing scheme, the modulation voltage 412 may be set as a middle voltage (Vmid), which may be a middle of the supply voltage (e.g., the supply voltage of the operational amplifier 414 may be 3.3 Volts (V) and Vmid may be half of 3.3 V or 1.65 V). The sensor circuitry 212 may drive the first subset of electrodes (e.g., the vertical electrodes, which are the transmitter electrodes) using the sensing signal associated with the transmitter voltage 402 and drive the second subset of electrodes (e.g., the horizontal electrodes, which are the receiver electrodes) using the middle voltage (Vmid). Subsequently, the sensor circuitry 212 may obtain resulting signals from the second subset of electrodes.

In addition to or as an alternative to using the ABS scheme and/or the mutual capacitance sensing scheme, the processing system 210 may further perform a temperature stable profile sensing scheme. In the temperature stable profile sensing scheme, instead of having the transmitter voltage 402 and the modulation voltage 412 being the same voltage signal (e.g., the ABS scheme) or setting the modulation voltage 412 to Vmid (e.g., the mutual capacitance sensing scheme), the processing system 210 may set the transmitter voltage 402 and the modulation voltage 412 based on a determined voltage ratio (e.g., a temperature stable ratio). For instance, referring to FIG. 4 and when the input object 240 is not present, Vout 418 may be calculated using the following expression:

$$V_{out} = \left[\frac{C_b}{C_{fb}} + 1\right] V_{mod} - \frac{nC_t}{C_{fb}}[V_{Tx} - V_{mod}]$$

where Vout is the output voltage 418, Cb is the background capacitance 406, Cfb is the feedback capacitance 416, $V_{mod}$ is the modulation voltage 412, "n" is the number of transmitter electrode and receiver electrode cross points for each receiver electrode, Ct is the mutual capacitance, $V_{Tx}$ is the transmitter voltage 402, and $V_{mod}$ is the modulation voltage 412.

Based on temperature changes, both Cb and Ct changes in the same direction (e.g., increasing or decreasing). Thus, based on this change being indicated as δCb and δCt, respectively, then the change in Vout (δVout) may use the following expression:

$$\delta V_{out} = \frac{1}{C_{fb}}V_{mod} * \delta C_b - \frac{n}{C_{fb}}[V_{Tx} - V_{mod}]\delta C_t$$

To make Vout temperature stable (e.g., not dependent upon the temperature of the environment), δVout is placed to zero, which leads to:

$$\frac{V_{mod}}{V_{Tx} - V_{mod}} = \frac{n * \delta C_t}{\delta C_b}$$

Based on letting the ratio β be:

$$\beta = \frac{V_{mod}}{V_{Tx}}$$

then the above expression becomes:

$$\frac{\beta}{1 - \beta} = \frac{n * \delta C_t}{\delta C_b}$$

After the sensor structure is fixed, the right side of the above expression (e.g., "n" multiplied by change in temperature of Cb and the result divided by the change in temperature of Ct) is substantially a constant. For instance, for a particular type of input device 100 that includes a particular sensor structure (e.g., the arrangement and/or orientation of sensor electrodes 205 shown in FIG. 2), the right side of the expression does not change significantly (e.g., vary) from particular input device to particular input device. For example, based on performing one or more experiments, the right side of the expression may be determined and provided to the processing system 210. Afterwards, based on input indicating this constant (e.g., a temperature change constant), the processing system 210 may determine ratio, β, between the modulation voltage $V_{mod}$ 412 and the transmitter voltage $V_{Tx}$ 402. Then, based on a selected voltage (e.g., the transmitter voltage 402) and the determined ratio β, the processing system 210 may calculate the other voltage (e.g., the modulation voltage $V_{mod}$ 412) to ensure that the ratio is satisfied. Thus, by satisfying the ratio, the output voltage Vout may be temperature stable (e.g., not dependent upon the temperature of the environment) as δVout is zero.

After determining the modulation voltage $V_{mod}$ 412 and/or the transmitter voltage $V_{Tx}$ 402 based on the ratio β, the processing system 210 (e.g., the sensor circuitry 212) may drive the sensor electrodes 205 using the determined modulation voltage $V_{mod}$ 412 and the transmitter voltage $V_{Tx}$ 402. For instance, the sensor electrodes 205 may be separated into a first subset of electrodes (e.g., the vertical electrodes) and a second subset of electrodes (e.g., horizontal electrodes). In each iteration (e.g., each frame such as capacitive frame described above), one of the subsets of electrodes may be the receiver electrodes and the other subset of electrodes may be the transmitter electrodes. For instance, in a first frame, the first subset of electrodes (e.g., the vertical electrodes) may be the transmitter electrodes and the second subset of electrodes (e.g., the horizontal electrodes) may be the receiver electrodes.

The processing system 210 may drive the first subset of electrodes (e.g., the transmitter electrodes) using the transmitter voltage 402 and drive the second subset of electrodes (e.g., the receiver electrodes) using the modulation voltage 412. Then, the processing system 210 may obtain resulting signals from the second subset of electrodes based on driving the first and second subset of electrodes. The obtained resulting signals may be used to determine a profile (e.g., a temperature stable profile). For example, each of the receiver channels 410 may be associated with an electrode (e.g., a receiver electrode) and may output a voltage (e.g., Vout 418). The determination module 216 may obtain the resulting signals (e.g., the voltage outputs from the receiver electrodes), and process the resulting signals to determine changes in capacitive coupling of the sensor electrodes 205. For instance, as mentioned above, processing the resulting signals may include removing a baseline measurement from the resulting signals, filtering the resulting signals, performing hysteresis on the resulting signals, and combining the resulting signals, among others, to determine the changes in capacitive coupling of the sensor electrodes 205. After processing the resulting signals, the processing system 210 may use the processed resulting signals for one or more tasks and/or functions. For instance, the processing system 210 may determine two sets of profiles—one profile based on the mutual capacitance sensing scheme (e.g., processed resulting signals based on using the mutual capacitance sensing scheme) and one profile based on using the temperature stable profile sensing scheme (e.g., processed resulting signals based on using the temperature stable profile sensing scheme). The processing system 210 may compare the two sets of profiles. For instance, based on using the mutual capacitance sensing scheme, the processing system 210 may determine the presence of an input object 240, but based on using the temperature stable profile sensing scheme, the processing system 210 might not detect the presence of an input object 240. In such examples, the processing system

210 may determine that the input object 240 is not present and instead, the mutual capacitance sensing scheme may have erred due to temperature sensitivity of the sensor electrodes 205. Additionally, and/or alternatively, in such examples, the processing system 210 may reset the baseline measurements such as by performing the mutual capacitance sensing scheme again and using the obtained sensing profile as the baseline.

The temperature stable profile sensing scheme was performed with the following design requirements. The following are merely exemplary and the temperature stable profile sensing scheme may utilize any design requirements. For instance, one slice of the direct digital synthesis (DDS) may be added to drive the sinusoidal waveform for the transmitter electrodes. The adjustable amplitude may be between two-thirds to one of its maximum amplitude (2-bit sufficient). Further, the design requirement may have fine amplitude control of $V_{mod}$, and the current design having four control bits may be sufficient. An achievable ratio $\beta/1-\beta$ may be obtained with a maximum of 8 and $\beta=8/9$ and/or minimum of 0.125 with $\beta=1/9$.

Merely for purposes of illustration and not limitation, the temperature stable profile sensing scheme was tested by having a cold metal slug being placed in ice-water beforehand, and then placed on top of an input device (e.g., a mobile device with electrodes). An ABS scheme profile, a mutual capacitance scheme profile, and a temperature stable profile sensing scheme profile were obtained based on the cold metal slug being placed on top of the input device. The ABS scheme profile was obtained using a 2.0 Voltage peak-to-peak (Vpp), the mutual capacitance scheme profile was obtained using a 2.52 Vpp, and the temperature stable profile was obtained using a transmitter voltage of 2.35 V and $V_{mod}$ (e.g., receiver electrode) at 0.725 Vpp. The ABS scheme profile had a finger signal at about 779 counts and residual signal after removing the slug at −431 counts, which is about −55% of the finger signal. The mutual capacitance scheme profile had a finger signal at about 575 counts and residual signal after removing the slug at 195 counts, which is about 34% of the finger signal. The temperature stable profile had a finger signal at about 636 counts and residual signal after removing the slug at −58 counts, which is about 9% of the finger signal. As such, compared to the ABS scheme, the temperature drift reduced from 55% to 9%, which is more than a five times improvement.

FIG. 5 depicts an exemplary flowchart for performing temperature stable profile sensing according to one or more examples of the present disclosure. The process 500 may be performed by the input devices 100 and/or 200 and, in particular, the processing system 110 shown in FIG. 1 and/or the processing system 210 shown in FIG. 2. However, it will be recognized that an input device that includes additional and/or fewer components as shown in FIGS. 1 and/or 2 may be used to perform process 500, that any of the following blocks may be performed in any suitable order, and that the process 500 may be performed in any suitable environment. The descriptions, illustrations, and processes of FIG. 5 are merely exemplary and the process 500 may use other descriptions, illustrations, and processes for performing temperature stable profile sensing.

In operation, at block 502, the processing system (e.g., the processing systems 110 and/or 210) sets a first voltage for driving a first subset of a plurality of electrodes based on a second voltage and a temperature stable ratio associated with the first voltage and the second voltage. For instance, in some variations, the first voltage may be the modulation voltage 412 and the second voltage may be the transmitter voltage 402. For example, as mentioned above, the processing system may obtain (e.g., determine and/or receive) a temperature stable ratio $\beta$, which is a ratio between the transmitter voltage and the modulation voltage. For instance, the temperature stable ratio $\beta$ may be based on the expression:

$$\frac{\beta}{1-\beta} = \frac{n * \delta C_t}{\delta C_b}$$

In the above expression, "n" and the changes in temperature of Ct ($\delta C_t$) and Cb ($\delta C_b$) may be substantially constant for a particular type of sensor structure (e.g., a sensor structure having eight horizontal and eight vertical electrodes, which is shown in FIG. 2). The processing system may obtain and/or receive (e.g., based on manual input from a user and/or based on being transmitted information from another device and/or computing system) information indicating "n", the changes in temperature of Ct and Cb (i.e., $\delta C_t$ and $\delta C_b$), a constant value or measurement representing the right hand of the above expression, and/or $\beta$. Using this information and a set value for a second voltage (e.g., the transmitter voltage 402), the processing system may determine and set the first voltage (e.g., the modulation voltage 412).

For example, in some instances, the processing system may receive information indicating "n" (e.g., eight in the example from FIG. 2), $\delta C_t$, and $\delta C_b$. The processing system may then use the received information to determine the temperature stable ratio/p. For instance, the processing system may use "n", $\delta C_t$, and $\delta C_b$ to compute a value (e.g., a constant) for the right-hand side of the expression. Then, after computing the right-hand side of the expression, the processing system may calculate $\beta$ using the expression above. Following, after independently setting the second voltage (e.g., the transmitter voltage 402), the processing system may set the first voltage (e.g., the modulation voltage 412) based on $\beta$. For example, as mentioned above, $\beta$ is equal to a ratio between the modulation voltage 412 and the transmitter voltage 402.

In some examples, the processing system may receive information indicating directly the temperature stable ratio $\beta$ and/or the value for the right-hand side of the expression. Subsequently, after independently setting the second voltage (e.g., the transmitter voltage 402), the processing system may set the first voltage (e.g., the modulation voltage 412) based on $\beta$ and/or the received information.

At block 504, the processing system drives the first subset of the plurality of electrodes using the first voltage and a second subset of the plurality of electrodes using the second voltage. For example, as mentioned above and in some variations, the first voltage may be the modulation voltage 412 and the second voltage may be the transmitter voltage 402. For instance, at block 502, the processing system may independently set the transmitter voltage 402 (e.g., the second voltage), and then calculate the modulation voltage 412 (e.g., the first voltage) based on the transmitter voltage 402 and the temperature stable ratio. Afterwards, at block 504, the processing system may determine the first subset of the plurality of electrodes (e.g., the horizontal electrodes) are the receiver electrodes and the second subset of the plurality of electrodes (e.g., the vertical electrodes) are the transmitter electrodes. Then, the processing system may drive the first subset of the plurality of electrodes using the first voltage (e.g., drive the receiver electrodes using the modulation voltage 412) and drive the second subset of the plurality of electrodes using the second voltage (e.g., drive the transmitter electrodes using the transmitter voltage 402). As mentioned above, the modulation voltage 412 and/or the transmitter voltage 402 are set based on a temperature stable ratio β.

In some instances, at block 502, rather than setting the modulation voltage 412 based on the transmitter voltage 402, the processing system may instead set the transmitter voltage 402 based on the modulation voltage 412. As such, in such instances, the first voltage may be the transmitter voltage 402 and the second voltage may be the modulation voltage 412. In other words, at block 502, the processing system may independently set the modulation voltage 412, and then calculate the transmitter voltage 402 based on the modulation voltage 412 and the temperature stable ratio. At block 504, based on the first voltage being the transmitter voltage 402 and the second voltage being the modulation voltage 412, the processing system may determine the first subset of the plurality of electrodes (e.g., the horizontal electrodes) are the transmitter electrodes and the second subset of the plurality of electrodes (e.g., the vertical electrodes) are the receiver electrodes. Then, the processing system may drive the first subset of the plurality of electrodes using the first voltage (e.g., drive the transmitter electrodes using the transmitter voltage 402) and drive the second subset of the plurality of electrodes using the second voltage (e.g., drive the receiver electrodes using the modulation voltage 412).

At block 506, the processing system may obtain resulting signals based on driving the first subset using the first voltage and driving the second subset using the second voltage. For instance, in the above example where the first subset of the plurality of electrodes are the receiver electrodes and the second subset of the plurality of electrodes are the transmitter electrodes, the first subset may be driven using the first voltage (e.g., driven using the modulation voltage 412) and the second subset may be driven using the second voltage (e.g., driven using the transmitter voltage 402). At block 506, given that the first subset are the receiver electrodes, the processing system may obtain resulting signals (e.g., a temperature stable sensing profile) from the first subset of electrodes.

In other words, referring to blocks 504 and 506, the processing system may assign one set of the sensor electrodes 205 (e.g., the horizontal electrodes) as the receiver electrodes and assign the other set of the sensor electrodes 205 (e.g., the vertical electrodes) as the transmitter electrodes. The processing system may drive the transmitter electrodes using the transmitter voltage 402 and drive the receiver electrodes using the modulation voltage 412. Subsequently, the processing system may obtain resulting signals from the receiver electrodes, which were driven using the modulation voltage 412. The resulting signals may indicate a temperature stable sensing profile (e.g., each of the receiver electrodes may provide a separate temperature stable sensing profile, which may be based on Vout 418).

At block 508, the processing system may perform object detection based on the obtained resulting signals. For example, based on the temperature stable sensing profile and/or additional sensing profiles (e.g., a mutual capacitance sensing profile), the processing system may determine whether an input object 240 such as a user's finger is on or near the sensing region 120 of the input device 100.

In other words, based on using the temperature stable profile sensing scheme (e.g., process 500), the processing system may be configured to determine whether there are objects (e.g., a finger, stylus, moisture, and so on) on the sensing region 120. Additionally, and/or alternatively, the temperature stable profile sensing scheme may be used with other sensing methods such as the ABS scheme and/or the mutual capacitance sensing scheme. For example, in the same frame (e.g., capacitive frame), the processing system may perform the temperature stable profile sensing scheme along with the ABS scheme and/or the mutual capacitance sensing scheme. For instance, the processing system may perform the mutual capacitance sensing scheme based on driving the transmitter electrodes such as the first subset of electrodes using a transmitter voltage and driving the receiver electrodes such as the second subset of electrodes using Vmid. The processing system may obtain first resulting signals (e.g., a mutual capacitance sensing profile) from the receiver electrodes. Furthermore, either before or after performing the mutual capacitance sensing scheme, the processing system may perform the temperature stable profile sensing scheme and obtain second resulting signals (e.g., a temperature stable profile).

Afterwards, the processing system may compare the first and second resulting signals. For example, the first resulting signals may indicate a detection of an input object, but the second resulting signals might not indicate a detection of the input object. As mentioned above, the capacitive sensors may be sensitive to temperature and based on the temperature of the environment, the first resulting signals (e.g., the signals obtained using the mutual capacitance sensing scheme) may have inaccuracy detected the input object. Thus, based on the comparison, the processing system may determine that there is not a presence of an input object on the sensing region 120 of the input device 100.

Additionally, and/or alternatively, based on the comparison, the processing system may re-set the baseline profile. For instance, at device start-up, the processing system may perform the mutual capacitance sensing scheme to obtain resulting signals, which may be indicated as baseline signals. As mentioned above, the baseline signals may be used for object detection. However, based on the comparison between the first and second resulting signals, the processing system may determine that the baseline may be inaccurate due to a temperature drift. Therefore, the processing system may be configured to re-set the baseline profile. For example, after comparing the first and second resulting signals, the processing system may perform the mutual capacitance sensing scheme again and obtain additional resulting signals. The processing system may re-set the baseline profile using the additional resulting signals.

In some examples, the processing system may perform the temperature stable profile sensing scheme (e.g., process 500) in addition to one or more additional sensing schemes. For instance, in the same frame and for certain applications (e.g., moisture detection), the processing system may perform the ABS sensing scheme, the mutual capacitance sensing scheme, and the temperature stable profile sensing scheme. In other applications, the temperature stable profile sensing scheme may replace one or more sensing schemes such as the ABS sensing schemes with the temperature stable profile sensing scheme. For instance, in the same frame, the processing system may only perform the mutual capacitance sensing scheme and the temperature stable profile sensing scheme.

FIG. 6 depicts an exemplary flowchart for performing reconstructed temperature stable profile sensing according to one or more examples of the present disclosure. The process 600 may be performed by the input devices 100 and/or 200 and, in particular, the processing system 110 shown in FIG. 1 and/or the processing system 210 shown in FIG. 2. However, it will be recognized that an input device that includes additional and/or fewer components as shown in FIGS. 1 and/or 2 may be used to perform process 600, that any of the following blocks may be performed in any suitable order, and that the process 600 may be performed in any suitable environment. The descriptions, illustrations, and processes of FIG. 6 are merely exemplary and the process 600 may use other descriptions, illustrations, and processes for performing reconstructed temperature stable profile sensing.

For example, as described in FIG. 5 and process 500, the processing system may perform a temperature stable profile sensing scheme to obtain a temperature stable sensing profile based on performing block 502 (e.g., setting a first voltage such as a modulation voltage 412 for driving a first subset of a plurality of electrodes based on a second voltage such as transmitter voltage 402 and a temperature stable ratio). In contrast, rather than setting the first voltage based on the temperature stable ratio, process 600 may instead use two sensing schemes described above (e.g., the ABS scheme and the mutual capacitance sensing scheme) and determine a reconstructed temperature stable profile to perform object detection based on the two sensing schemes.

For instance, at block 602, based on driving a first subset of a plurality of electrodes, the processing system (e.g., the processing systems 110 and/or 210) obtains first resulting signals from a second subset of the plurality of electrodes. For example, as mentioned above, the processing system may use different sensing schemes such as an ABS scheme and/or a mutual capacitance sensing scheme. At block 602, the processing system may perform the mutual capacitance sensing scheme. When performing the mutual capacitance sensing scheme, the processing system may drive a first subset of sensor electrodes 205 (e.g., the vertical electrodes) using a sensing signal associated with the transmitter voltage 402 and the second subset of sensor electrodes 205 (e.g., the horizontal electrodes) with another voltage (e.g., a pre-defined voltage such as Vmid or 1.65 V). Subsequently, the sensor circuitry 212 may obtain first resulting signals from the second subset of electrodes (e.g., the horizontal electrodes). The first resulting signals may indicate a mutual capacitance sensing profile (e.g., a profile indicating signals that are received from the second subset of electrodes when performing the mutual capacitance sensing scheme).

At block 604, based on driving both the first subset and the second subset of the plurality of electrodes, the processing system obtains second resulting signals from the second subset of the plurality of electrodes. For instance, at block 604, the processing system may use an ABS scheme. As mentioned above, when performing the ABS scheme, the processing system may drive the sensor electrodes (e.g., the vertical and horizontal sensor electrodes 205 shown in FIG. 2) using a transmitter voltage 402 and a modulation voltage 412 that are the same (e.g., the same magnitude and/or the same waveform). The processing system may obtain second resulting signals from the second subset of the plurality of electrodes (e.g., the horizontal electrodes) based on driving the first and second subset of the plurality of electrodes. The second resulting signals may indicate an ABS profile (e.g., a profile indicating signals that are received from the second subset of electrodes when performing the ABS scheme).

In some examples, blocks 602 and 604 may be performed in subsequent frames (e.g., subsequent capacitive frames). For example, in a first capacitive frame, the processing system may perform block 602 (e.g., the mutual capacitance sensing scheme) to obtain the mutual capacitance sensing profile. In a second capacitive frame that follows the first capacitive frame, the processing system may perform block 604 (e.g., the ABS scheme) to obtain the ABS profile. In other examples, this may be reversed (e.g., the processing system may perform the ABS scheme in a first capacitive frame and may then perform the mutual capacitance sensing scheme in a second capacitive frame that follows the first capacitive frame).

At block 606, the processing system determines a reconstructed temperature stable profile based on a mutual capacitance sensing profile associated with the first resulting signals, an ABS profile associated with the second resulting signals, and a reconstructed temperature stable parameter. For instance, based on performing the mutual capacitance sensing scheme and the ABS scheme, the processing system may obtain the mutual capacitance sensing profile and the ABS profile. Then, using the mutual capacitance sensing profile and the ABS profile, the processing system may determine a reconstructed temperature stable profile that is temperature invariant (e.g., the signals do not change with temperature). For example, when an object is present, the resulting signals indicated by the ABS profile (e.g., the second resulting signals) may increase while the resulting signals indicated by the mutual capacitance sensing profile (e.g., the first resulting signals) may decrease. In contrast, when temperature increases, both the first and second resulting signals indicated by the ABS profile and the mutual capacitance sensing profile may increase. Thus, based on a reconstructed temperature stable parameter, which may be a constant, the processing system may determine a reconstructed temperature stable profile using the mutual capacitance sensing profile and the ABS profile.

For instance, in some examples, the processing system may determine the reconstructed temperature stable profile based on:

$$C_p = C_b - \alpha C_t$$

where $C_p$ is the reconstructed temperature stable profile, $C_b$ is the ABS profile, $C_t$ is the mutual capacitance sensing profile, and $\alpha$ is the reconstructed temperature stable parameter.

For example, in some variations, the resulting signals from the ABS profile $C_b$ may increase based on an ABS temperature coefficient $k_b$ and the mutual capacitance sensing profile $C_t$ may increase based on a mutual capacitance sensing temperature coefficient $k_t$. For instance, when the temperature increases by one degree Celsius, the reconstructed temperature stable profile $C_p$ may increase by $k_b C_b - \alpha k_t C_t$.

Therefore, based on setting the reconstructed temperature stable parameter $\alpha$ to be:

$$\alpha = \frac{k_b C_b}{k_t C_t}$$

then $C_p$ does not change with temperature.

In addition, when detecting an input object (e.g., the input object 240), the following expression for $C_p$ may be used:

$$\Delta C_p = \Delta C_b - \alpha \Delta C_t$$

which indicates that the resulting signals for the reconstructed temperature stable profile $C_p$ would be greater in magnitude than $\Delta C_b$ given that $\alpha \Delta C_t$ is negative.

As such, the reconstructed temperature stable profile $C_p$ indicates resulting signals that are greater in magnitude than the second resulting signals from the ABS profile (e.g., obtained at block 604) and are temperature invariant.

Following, the reconstructed temperature stable profile $C_p$ may be used to mitigate ghost touch events that are caused by temperature drift. For example, at block 608, the processing system performs object detection based on the reconstructed temperature stable profile.

In other words, the processing system may determine the reconstructed temperature stable profile based on subtracting the product of the reconstructed temperature stable parameter and the mutual capacitance sensing profile from the ABS profile. For example, referring to FIG. 2, the second subset of sensor electrodes 205 may include eight horizontal electrodes. Each of the eight horizontal electrodes may be used to obtain resulting signals for the ABS profile and the mutual capacitance sensing profile (e.g., eight resulting signals for the ABS profile and eight resulting signals the mutual capacitance sensing profile). At block 606, the processing system may multiply the eight resulting signals from the mutual capacitance sensing profile with the reconstructed temperature stable parameter (e.g., a constant such as −2.20). Then, the processing system may subtract the result of the multiplication from the eight resulting signals from the ABS profile to obtain the reconstructed temperature stable profile for the eight horizontal electrodes.

In some examples, the processing system may obtain the reconstructed temperature stable parameter α from user input and/or from another device and/or server. For example, the processing system may be associated with an input device such as a mobile device. The input device may receive the reconstructed temperature stable parameter α from another device and/or server. For instance, a server may push a firmware update for the input device, and the firmware update may include the reconstructed temperature stable parameter α. In some examples, the processing system might not directly receive the reconstructed temperature stable parameter α, and instead, the processing system may receive the ABS temperature coefficient $k_b$ and the mutual capacitance sensing temperature coefficient $k_r$. The processing system may calculate the reconstructed temperature stable parameter α based on the ABS temperature coefficient $k_b$ and the mutual capacitance sensing temperature coefficient $k_r$.

In some instances, the reconstructed temperature stable parameter α may be associated with a particular sensor structure (e.g., a sensor structure having a particular number and/or orientation of sensor electrodes such as the eight horizontal and vertical bar sensor electrodes 205 shown in FIG. 2) and/or a particular type of input device. For instance, each input device having the same sensor structure may have a slightly different reconstructed temperature stable parameter α. Therefore, based on testing a plurality of input devices having the same sensor structure, a plurality of reconstructed temperature stable parameters a may be obtained. Subsequently, an average of the plurality of reconstructed temperature stable parameters a may be determined. A device and/or server may provide the average reconstructed temperature stable parameter α to one or more input devices. Then, the input devices may perform process 600 described above and using the average reconstructed temperature stable parameter α to perform the reconstructed temperature stable profile sensing scheme.

In some examples, the process 600 may be repeated one or more iterations. For example, based on performing process 600 in a first iteration, a first reconstructed temperature stable profile associated with a second subset of the plurality of electrodes (e.g., the horizontal electrodes) may be obtained. Based on the first reconstructed temperature stable profile, an input object (e.g., the input object 240) may be detected. But, the input object may be detected only on one-axis (e.g., the horizontal axis). Thus, process 600 may be performed again and a second reconstructed temperature stable profile associated with the vertical electrodes may be obtained. Based on the first and second reconstructed temperature stable profiles, the processing system may obtain a location of the input object along the x-axis and the y-axis.

In some instances, performing the reconstructed temperature stable profile sensing scheme of FIG. 6 as compared to performing the temperature stable profile sensing scheme of FIG. 5 may result in more accurate measurements (e.g., achieving a higher resolution scanning scheme for object detection). For instance, process 600 of FIG. 6 may utilize firmware aspects whereas process 500 of FIG. 5 may utilize hardware elements. As such, greater resolution may be able to be achieved using process 600 and the reconstructed temperature stable profile sensing scheme. In some examples, the reconstructed temperature stable profile sensing scheme of FIG. 6 may use additional capacitive frames as compared to the temperature stable profile sensing scheme of FIG. 5. For example, whereas the temperature stable profile sensing scheme of FIG. 5 may utilize a single capacitive frame, the reconstructed temperature stable profile sensing scheme of FIG. 6 requires two capacitive frames (e.g., a first capacitive frame for performing block 602 and the mutual capacitance sensing scheme, and a second capacitive frame for performing block 604 and the ABS scheme). Therefore, the temperature stable profile sensing scheme of FIG. 5 may utilize less power consumption and time budget when compared to the reconstructed temperature stable profile sensing scheme of FIG. 6.

Merely for purposes of illustration and not limitation, the reconstructed temperature stable profile sensing scheme was tested by having a cold metal slug being placed in ice-water beforehand, and then placed on top of an input device (e.g., a mobile device with electrodes). An ABS scheme profile and a mutual capacitance scheme profile were obtained based on the cold metal slug being placed on top of the input device. For instance, the touch sensing raw data collection frame rate was about three frames per second (fps). The data collection procedure included four steps. In a first step, the raw data collection was started for about one hundred frames as a baseline. In a second step, the metal slug was placed on top of the input device (same location for both the ABS scheme and the mutual capacitance scheme). In a third step, the metal slug was removed at around the five hundredth frame. In a fourth step, five hundred additional frames were recorded for a total of one thousand frames per test.

Figure 7A:
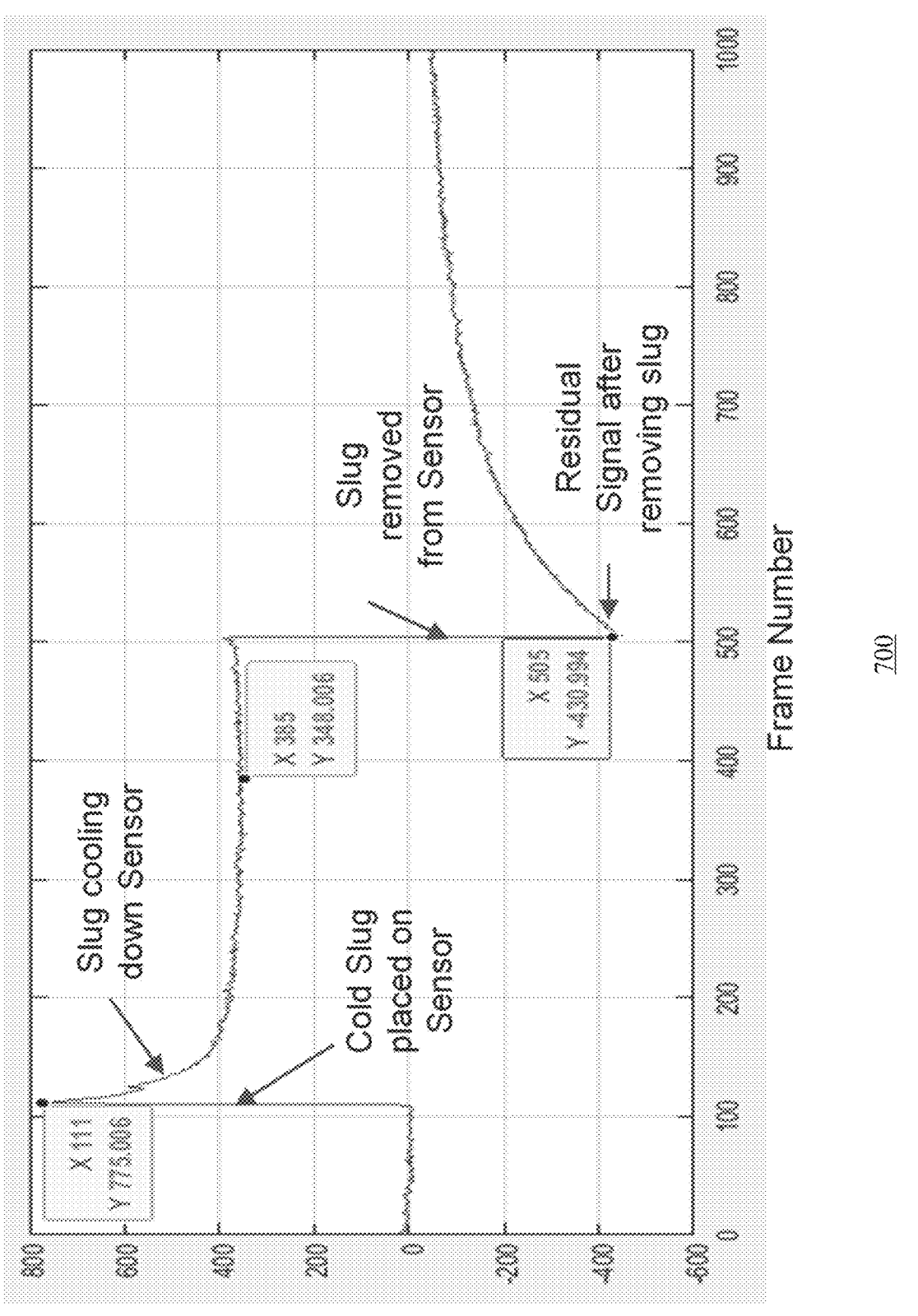
FIGS. 7A-7C depict graphical representations of different sensing profiles according to one or more examples of the present disclosure.
Figure 7B:
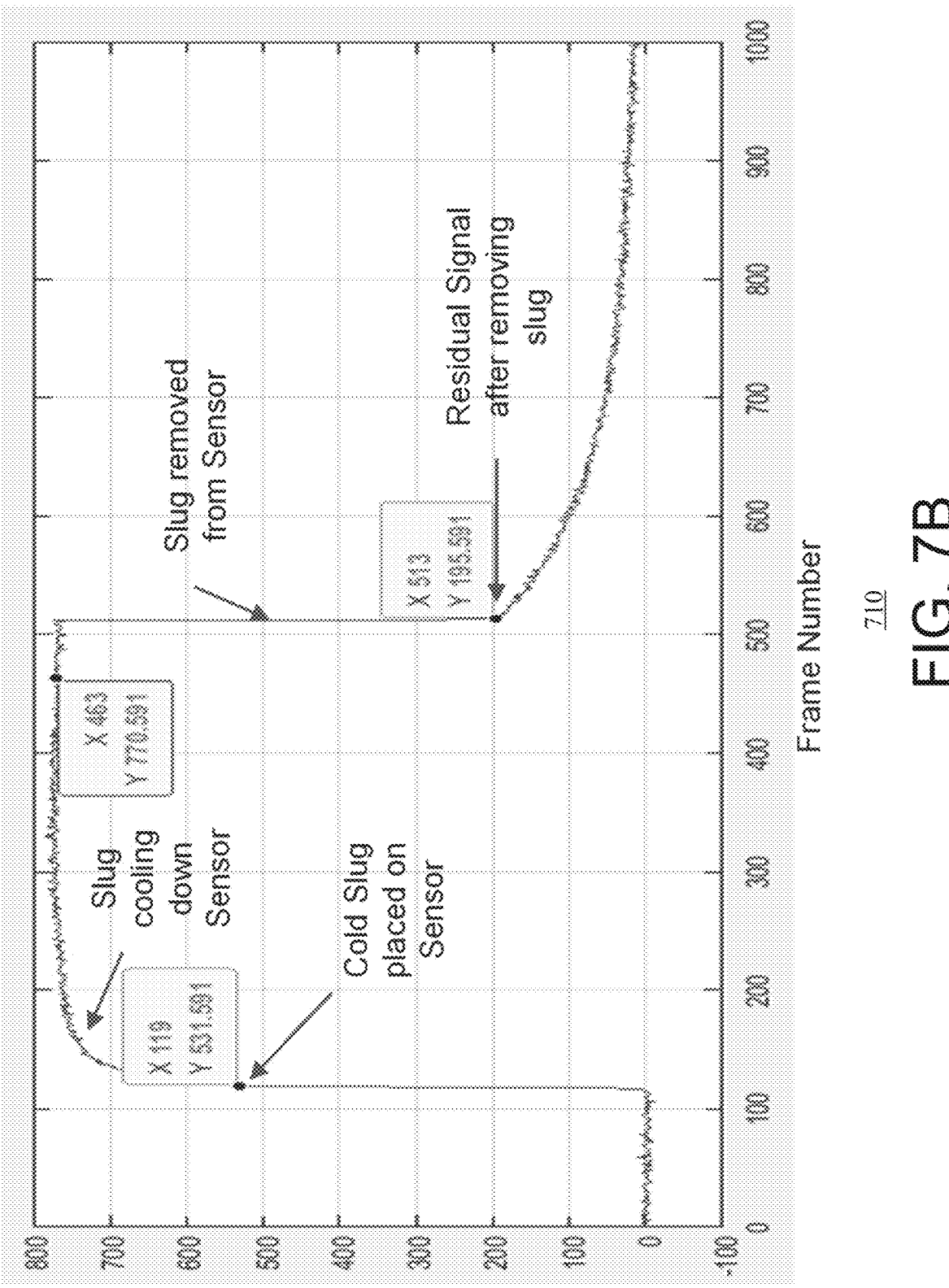
Figure 7C:
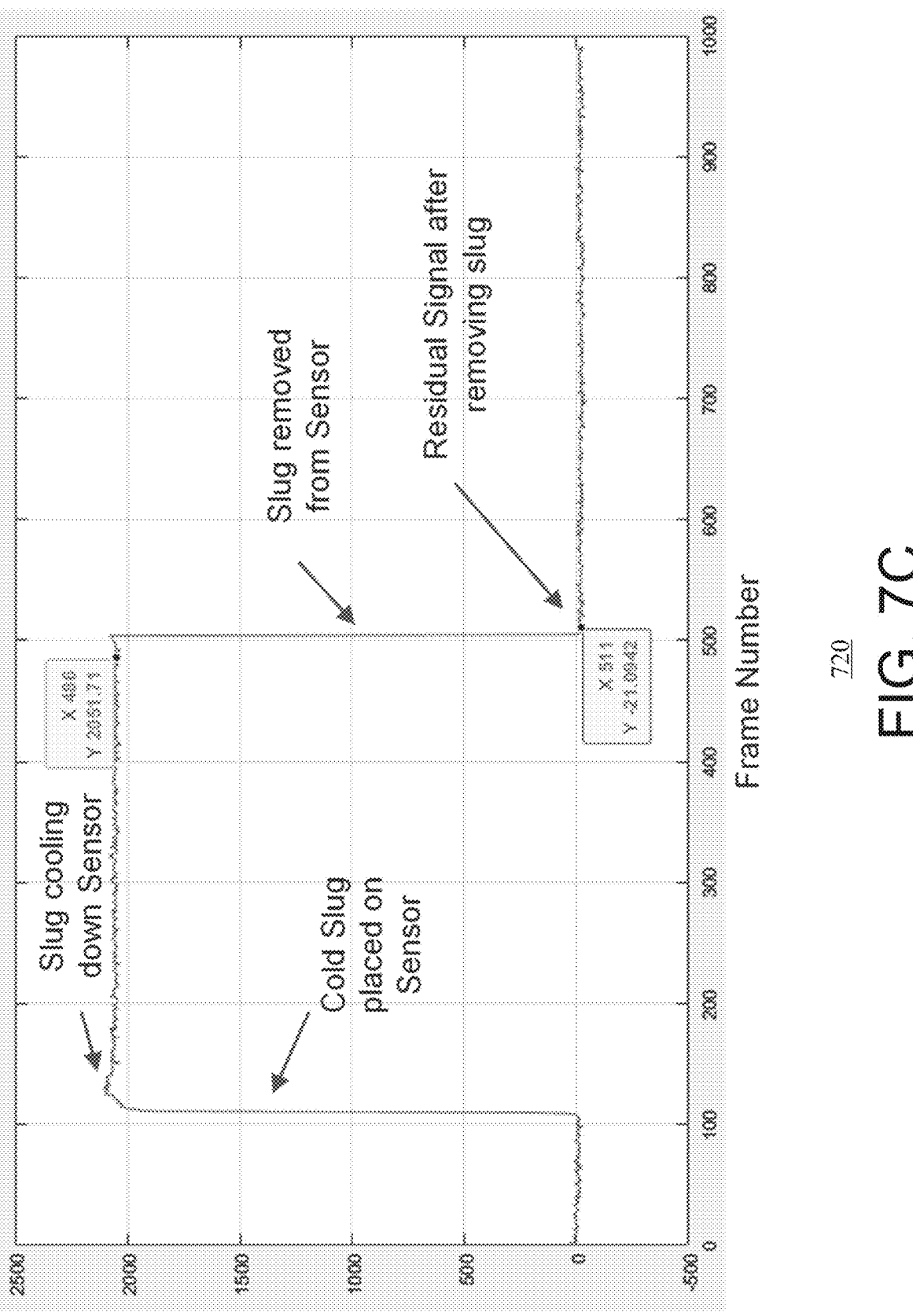

The results from the test are shown in FIGS. 7A-7C. For example, FIGS. 7A-7C depict graphical representations 700-720 of different sensing profiles according to one or more examples of the present disclosure. For instance, FIG. 7A shows a graphical representation 700 of performing block 604 and the ABS scheme. The ABS scheme may utilize a voltage of 2.0 Volts peak-to-peak (Vpp). As shown, the cold metal slug is placed on the sensor. Then, the metal slug cools down the sensor. The metal slug is removed from the sensor, but as shown after the metal slug is removed, there is a residual signal that is still detected (e.g., a residual signal that is detected around −430, which is about −55% of the object detection signal).

FIG. 7B shows a graphical representation 710 of performing block 602 and the mutual capacitance sensing scheme. The mutual capacitance sensing scheme may utilize a voltage of 2.52 Vpp. As shown, the cold metal slug is placed on the sensor. Then, the metal slug cools down the sensor. The metal slug is removed from the sensor, but as shown after the metal slug is removed, there is a residual signal that is still detected (e.g., a residual signal that is detected around 195, which is about 34% of the object detection signal).

FIG. 7C shows a graphical representation 720 of a signal from the reconstructed temperature stable profile. For instance, the reconstructed temperature stable parameter $\alpha$ that is obtained may be −2.20. In some instances, the reconstructed temperature stable parameter $\alpha$ may be based on the detection of the residual signal after removing the metal slug (e.g., the reconstructed temperature stable parameter $\alpha$ may equal −430 divided by 195). As shown, the cold metal slug is placed on the sensor and cools down the sensor. The metal slug is removed from the sensor, but as shown after the metal slug is removed, there is not a significant residual signal (e.g., around −21, which is about 1% of the objection detection signal and is the same level as the noise floor). As such, using the reconstructed temperature stable profile and process 600 may result in a greater resolution and/or accuracy.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary examples are described herein. Variations of those exemplary examples may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing a reconstructed temperature stable profile sensing scheme, comprising:
  based on driving a first subset of a plurality of electrodes, obtaining first resulting signals from a second subset of the plurality of electrodes;
  based on driving both the first subset and the second subset of the plurality of electrodes, obtaining second resulting signals from the second subset of the plurality of electrodes;
  obtaining a first temperature coefficient associated with an absolute capacitance sensing (ABS) profile and a second temperature coefficient associated with a mutual capacitance sensing profile;
  calculating a reconstructed temperature stable parameter based on the first temperature coefficient and the second temperature coefficient;
  determining a reconstructed temperature stable profile based on the mutual capacitance sensing profile associated with the first resulting signals, the ABS profile associated with the second resulting signals, and the reconstructed temperature stable parameter; and
  performing object detection based on the reconstructed temperature stable profile.

2. The method of claim 1,
  wherein the reconstructed temperature stable parameter indicates a ratio associated with the mutual capacitance sensing profile and the ABS profile.

3. The method of claim 1, wherein determining the reconstructed temperature stable profile is based on the below:

$$C_p = C_b - \alpha C_t$$

where $C_p$ is the reconstructed temperature stable profile, $C_b$ is the ABS profile, $C_t$ is the mutual capacitance sensing profile, and $\alpha$ is the reconstructed temperature stable parameter.

4. The method of claim 3, wherein the reconstructed temperature stable parameter $\alpha$ is based on the below:

$$\alpha = \frac{k_b C_b}{k_t C_t}$$

where $k_b$ is the first temperature coefficient that is associated with the ABS profile and $k_t$ is the second temperature coefficient that is associated with the mutual capacitance sensing profile.

5. The method of claim 1, wherein obtaining the first resulting signals comprises:
  driving the first subset of the plurality of electrodes using a transmitter voltage;
  driving the second subset of the plurality of electrodes using a pre-defined voltage that is different from the transmitter voltage; and
  obtaining the first resulting signals based on driving the first subset of the plurality of electrodes using the transmitter voltage and driving the second subset of the plurality of electrodes using the pre-defined voltage.

6. The method of claim 5, wherein obtaining the second resulting signals comprises:
  driving the first subset of the plurality of electrodes and the second subset of the plurality of electrodes using a same voltage; and

obtaining the second resulting signals based on driving the first subset of the plurality of electrodes and the second subset of the plurality of electrodes using the same voltage.

7. The method of claim 1, wherein obtaining the first resulting signals comprises obtaining the first resulting signals from the second subset of the plurality of electrodes in a first capacitive frame, and wherein obtaining the second resulting signals comprises obtaining the second resulting signals from the second subset of the plurality of electrodes in a second capacitive frame that is subsequent to the first capacitive frame.

8. The method of claim 1, wherein performing the object detection comprises:

obtaining a second reconstructed temperature stable profile based on a second mutual capacitance sensing profile, a second ABS profile, and the reconstructed temperature stable parameter; and detecting a location of an input object based on the reconstructed temperature stable profile and the second reconstructed temperature stable profile.

9. An input device for performing a reconstructed temperature stable profile sensing scheme, comprising:

a plurality of electrodes; and a processing system configured to:

based on driving a first subset of the plurality of electrodes, obtain first resulting signals from a second subset of the plurality of electrodes;

based on driving both the first subset and the second subset of the plurality of electrodes, obtain second resulting signals from the second subset of the plurality of electrodes;

obtain a first temperature coefficient associated with an absolute capacitance sensing (ABS) profile and a second temperature coefficient associated with a mutual capacitance sensing profile;

calculate a reconstructed temperature stable parameter based on the first temperature coefficient and the second temperature coefficient;

determine a reconstructed temperature stable profile based on the mutual capacitance sensing profile associated with the first resulting signals, the ABS profile associated with the second resulting signals, and the reconstructed temperature stable parameter; and perform object detection based on the reconstructed temperature stable profile.

10. The input device of claim 9, wherein the reconstructed temperature stable parameter indicates a ratio associated with the mutual capacitance sensing profile and the ABS profile.

11. The input device of claim 9, wherein determining the reconstructed temperature stable profile is based on the below:

$$C_p = C_b - \alpha C_t$$

where $C_p$ is the reconstructed temperature stable profile, $C_b$ is the ABS profile, $C_t$ is the mutual capacitance sensing profile, and $\alpha$ is the reconstructed temperature stable parameter.

12. The input device of claim 11, wherein the reconstructed temperature stable parameter $\alpha$ is based on the below:

$$\alpha = \frac{k_b C_b}{k_t C_t}$$

30 where $k_b$ is the first temperature coefficient that is associated with the ABS profile and $k_t$ is the second temperature coefficient that is associated with the mutual capacitance sensing profile.

13. The input device of claim 9, wherein obtaining the first resulting signals comprises:

driving the first subset of the plurality of electrodes using a transmitter voltage;

driving the second subset of the plurality of electrodes using a pre-defined voltage that is different from the transmitter voltage; and obtaining the first resulting signals based on driving the first subset of the plurality of electrodes using the transmitter voltage and driving the second subset of the plurality of electrodes using the pre-defined voltage.

14. The input device of claim 13, wherein obtaining the second resulting signals comprises:

driving the first subset of the plurality of electrodes and the second subset of the plurality of electrodes using a same voltage; and obtaining the second resulting signals based on driving the first subset of the plurality of electrodes and the second subset of the plurality of electrodes using the same voltage.

15. The input device of claim 9, wherein obtaining the first resulting signals comprises obtaining the first resulting signals from the second subset of the plurality of electrodes in a first capacitive frame, and wherein obtaining the second resulting signals comprises obtaining the second resulting signals from the second subset of the plurality of electrodes in a second capacitive frame that is subsequent to the first capacitive frame.

16. The input device of claim 9, wherein performing the object detection comprises:

obtaining a second reconstructed temperature stable profile based on a second mutual capacitance sensing profile, a second ABS profile, and the reconstructed temperature stable parameter; and detecting a location of an input object based on the reconstructed temperature stable profile and the second reconstructed temperature stable profile.

17. A non-transitory computer-readable medium having processor-executable instructions stored thereon for performing a reconstructed temperature stable profile sensing scheme, wherein the processor-executable instructions, when executed, facilitate:

based on driving a first subset of a plurality of electrodes, obtaining first resulting signals from a second subset of the plurality of electrodes;

based on driving both the first subset and the second subset of the plurality of electrodes, obtaining second resulting signals from the second subset of the plurality of electrodes;

obtaining a first temperature coefficient associated with an absolute capacitance sensing (ABS) profile and a second temperature coefficient associated with a mutual capacitance sensing profile;

calculating a reconstructed temperature stable parameter based on the first temperature coefficient and the second temperature coefficient;

determining a reconstructed temperature stable profile based on the mutual capacitance sensing profile associated with the first resulting signals, the ABS profile associated with the second resulting signals, and the reconstructed temperature stable parameter; and performing object detection based on the reconstructed temperature stable profile.

18. The non-transitory computer-readable medium of claim 17, wherein the reconstructed temperature stable parameter indicates a ratio associated with the mutual capacitance sensing profile and the ABS profile.

19. The non-transitory computer-readable medium of claim 17, wherein determining the reconstructed temperature stable profile is based on the below:

$$C_p = C_b - \alpha C_t$$

where $C_p$ is the reconstructed temperature stable profile, $C_b$ is the ABS profile, $C_t$ is the mutual capacitance sensing profile, and $\alpha$ is the reconstructed temperature stable parameter.

20. The non-transitory computer-readable medium of claim 19, wherein the reconstructed temperature stable parameter $\alpha$ is based on the below:

$$\alpha = \frac{k_b C_b}{k_t C_t}$$

where $k_b$ is the first temperature coefficient that is associated with the ABS profile and $k_t$ is the second temperature coefficient that is associated with the mutual capacitance sensing profile.

* * * * *